United States Patent
Suzukawa et al.

(10) Patent No.: US 6,880,619 B1
(45) Date of Patent: Apr. 19, 2005

(54) HEAT TREATING PLANT, INSTALLATION METHOD FOR POROUS REGENERATIVE ELEMENT, PRODUCTION METHOD FOR HEAT TREATED SUBSTANCE, SELECTION METHOD FOR POROUS REGENERATIVE ELEMENT, AND SPENT POROUS REGENERATIVE ELEMENT COMPONENT MEMBER

(75) Inventors: Yutaka Suzukawa, Tokyo-to (JP); Isao Mori, Tokyo-to (JP); Masayasu Nagoshi, Tokyo-to (JP); Takeshi Tada, Yokohama (JP); Jun Sudo, Yokohama (JP); Yoshiyuki Kasai, Nagoya (JP); Kazuhiko Umehara, Nagoya (JP)

(73) Assignees: NKK Corporation, Tokyo (JP); Nippon Furnace Kogyo Kaisha, Ltd., Yokohama (JP); NGK Insulators, Ltd., Nagoya (JP)

(*) Notice: Subject to any disclaimer, the term of this patent is extended or adjusted under 35 U.S.C. 154(b) by 487 days.

(21) Appl. No.: 09/830,760
(22) PCT Filed: Aug. 31, 2000
(86) PCT No.: PCT/JP00/05917
§ 371 (c)(1), (2), (4) Date: May 31, 2001
(87) PCT Pub. No.: WO01/16527
PCT Pub. Date: Mar. 8, 2001

(30) Foreign Application Priority Data

Sep. 1, 1999 (JP) .......................................... P11-248081

(51) Int. Cl.⁷ .............................................. F28D 19/00
(52) U.S. Cl. ........................... 165/10; 165/9.2; 165/9.3; 165/4
(58) Field of Search ............................... 165/10, 4, 9.2, 165/9.3; 431/11, 180, 181, 215

(56) References Cited

U.S. PATENT DOCUMENTS

| | | | |
|---|---|---|---|
| 4,397,740 A | | 8/1983 | Koontz |
| 4,522,588 A | * | 6/1985 | Todd et al. ................. 432/181 |
| 5,695,002 A | * | 12/1997 | Tanaka et al. ................ 165/10 |
| 5,755,569 A | * | 5/1998 | Berg et al. .................. 432/181 |
| 5,944,504 A | * | 8/1999 | Tanaka et al. ................ 431/11 |
| 5,992,504 A | * | 11/1999 | Kumazawa et al. ......... 165/9.2 |
| 6,062,297 A | * | 5/2000 | Kasai et al. ................. 165/9.1 |
| 6,210,645 B1 | * | 4/2001 | Kumazawa et al. ........ 422/206 |
| 6,488,076 B1 | * | 12/2002 | Yasuda et al. ................. 165/4 |

FOREIGN PATENT DOCUMENTS

| JP | 10-267262 | 10/1998 |
|---|---|---|
| JP | 10-300063 | 11/1998 |

OTHER PUBLICATIONS

Patent Abstracts of Japan, vol. 1997, No. 07, Jul. 31, 1997 and JP 09–079525 A (Nippon Steel Corp.), Mar. 26, 1997—Abstract only.

Patent Abstracts of Japan, vol. 1997, No. 07, Jul. 31, 1997 and JP 09–079527 A (NKK Corp.), Mar. 28, 1997—Abstract only.

* cited by examiner

Primary Examiner—Henry Bennett
Assistant Examiner—Nihir Patel
(74) Attorney, Agent, or Firm—Frishauf, Holtz, Goodman & Chick, P.C.

(57) ABSTRACT

A heat treatment equipment having a heating chamber having a plurality of regenerative combustors provided with direct-fired burner having a built-in porous regenerator, for applying a heat treatment to an object in the heating chamber, wherein the substantial average surface pore diameter is not uniform for porous regenerators in a plurality of direct-fired burners or a plurality of regenerative combustors. By making contrivances in the shape of porous regenerators of the direct-fired burners or the regenerative heat exchangers arranged in an area where substances causing choking tend to easily adhere to make it difficult for such substances to adhere or prevent choking phenomenon from becoming apparent.

20 Claims, 23 Drawing Sheets

FIG. 6
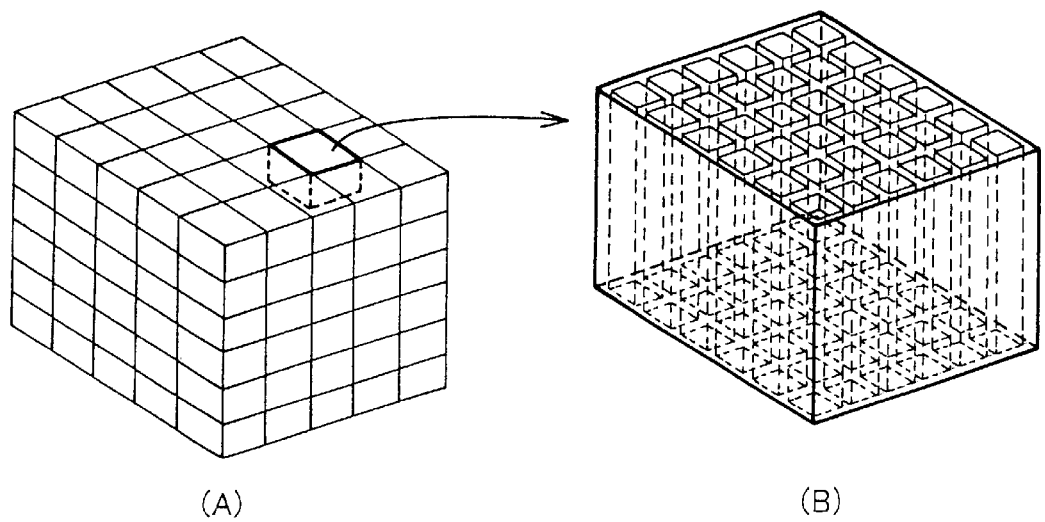
(A)  (B)
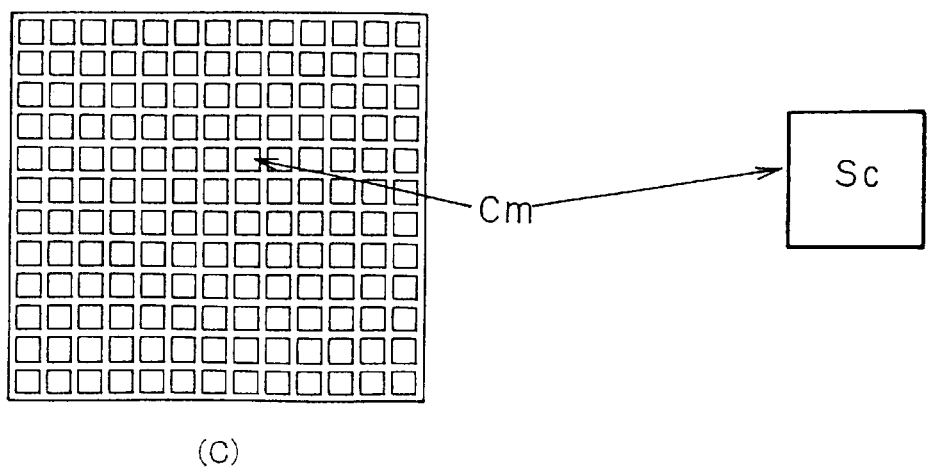
(C)

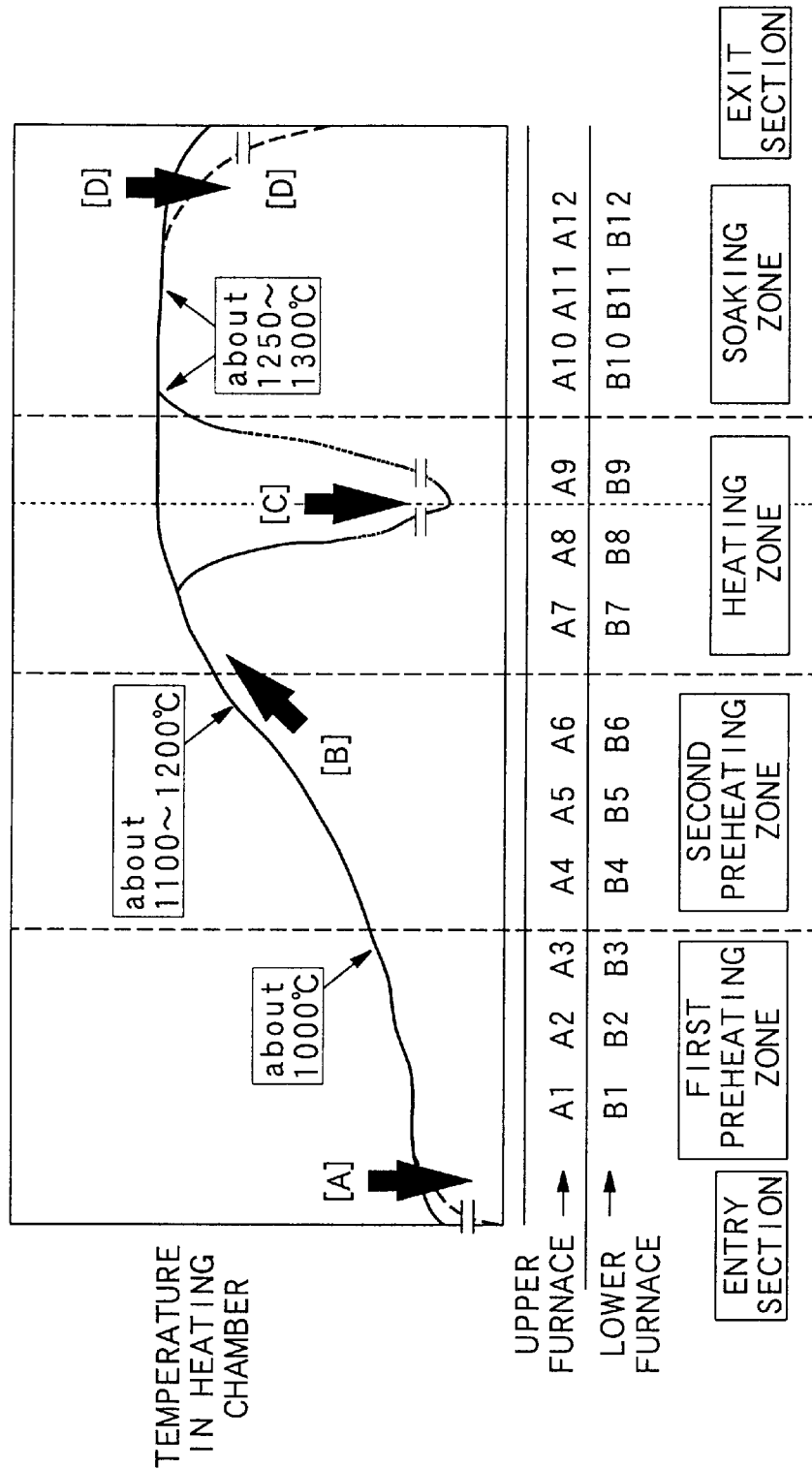

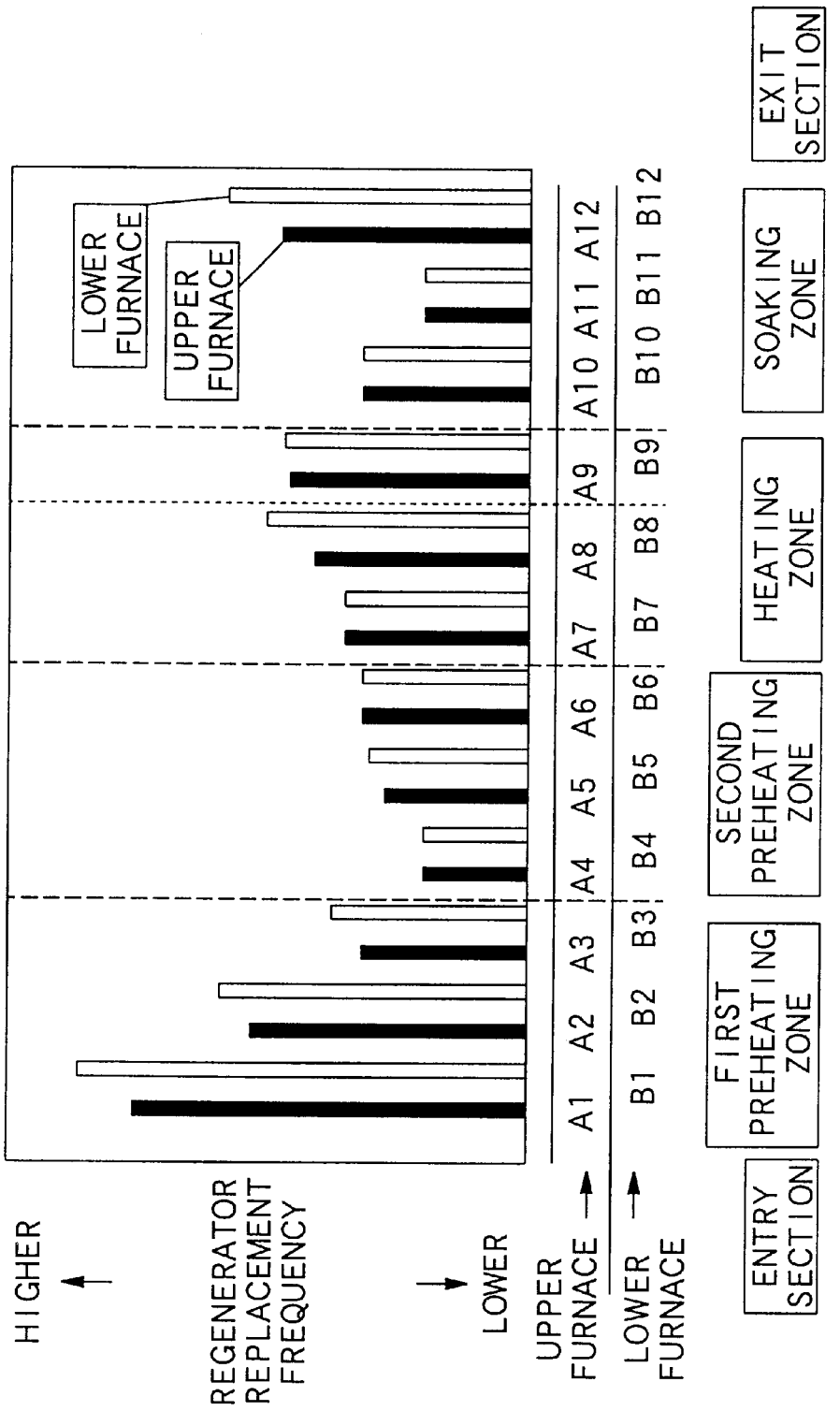

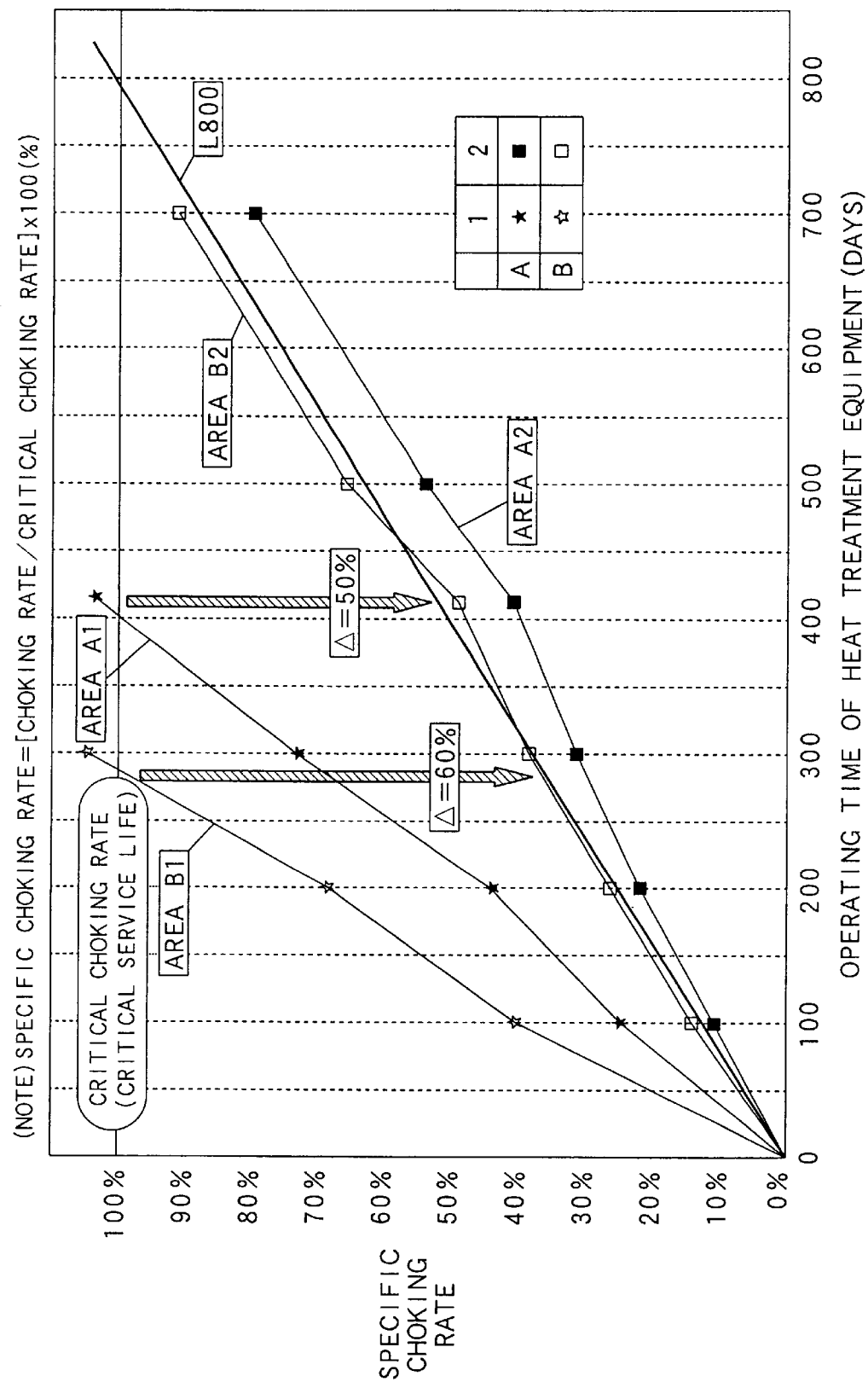

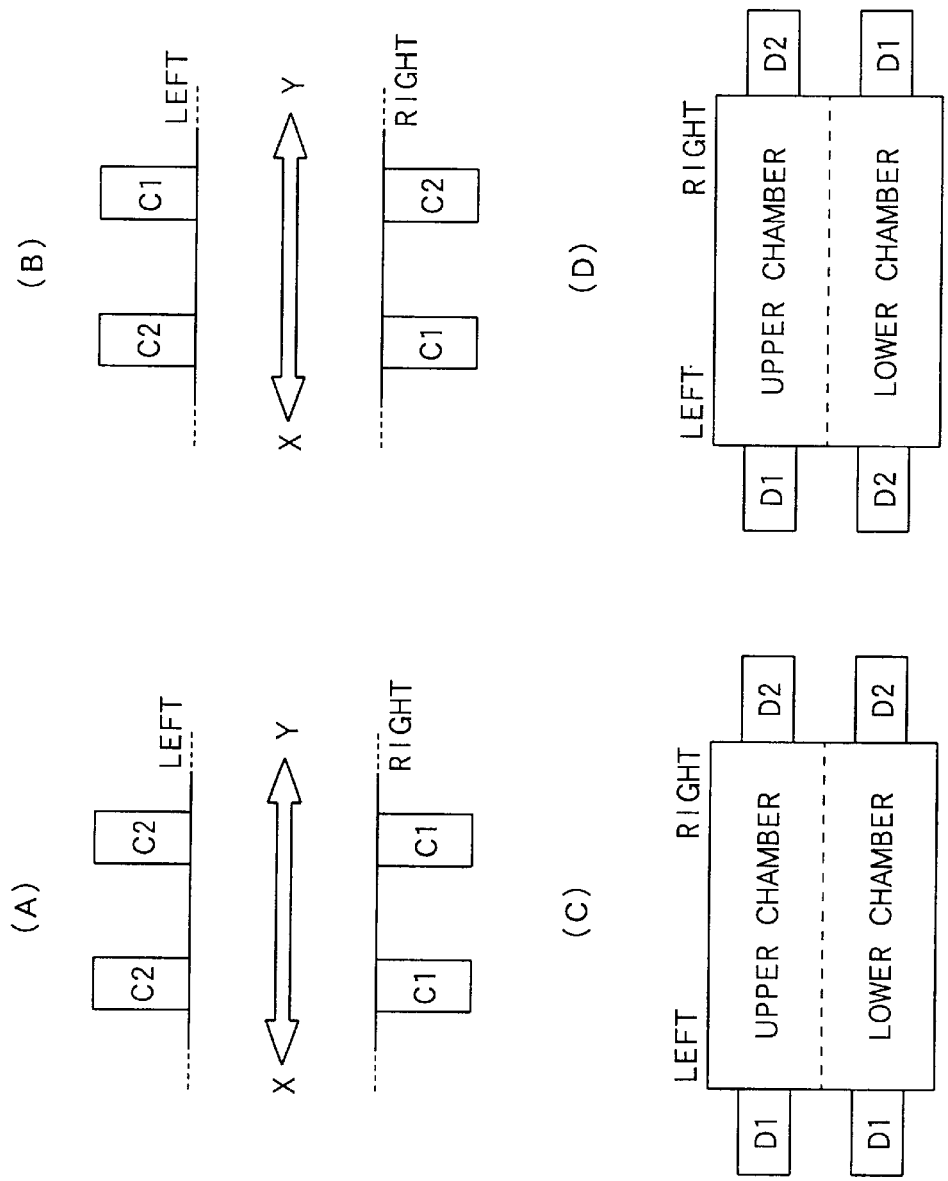

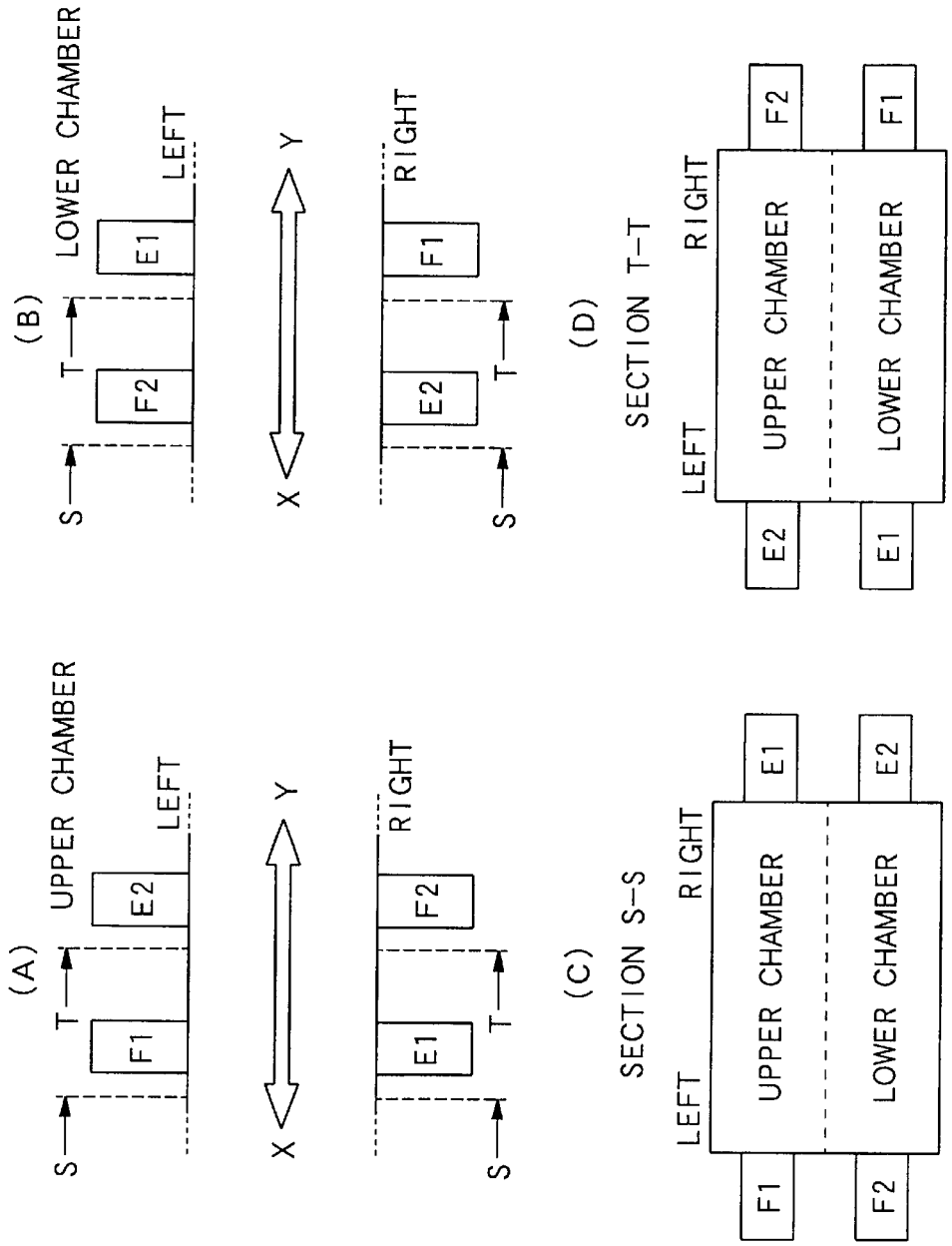

HEAT TREATING PLANT, INSTALLATION METHOD FOR POROUS REGENERATIVE ELEMENT, PRODUCTION METHOD FOR HEAT TREATED SUBSTANCE, SELECTION METHOD FOR POROUS REGENERATIVE ELEMENT, AND SPENT POROUS REGENERATIVE ELEMENT COMPONENT MEMBER

BACKGROUND OF THE INVENTION

1. Field of the Invention

The present invention relates to a heat treatment equipment provided with a heating chamber having a plurality of regenerative combustors each provided with a direct-fired burner having a porous heat accumulating body built therein and applying a heat treatment to an object in the heating chamber; an installing method of a porous heat accumulating body when applying a heat treatment to the object in the heating chamber having a plurality of such regenerative combustors; and a manufacturing method of a heat-treated object using such a heat treatment equipment; a heat treatment equipment provided with a space in which a plurality of heat exchangers each having a built-in porous heat accumulating body are attached; an installing method of a porous heat accumulating body in such a heat treatment equipment; and a manufacturing method of a heat-treated object, using such a heat treatment equipment. More particularly, the invention relates to a heat treatment equipment, an installing method of a porous heat accumulating body, and a manufacturing method of a heat-treated object, in which the substantial average surface pore diameters of the porous heat accumulating bodies are not uniform for the plurality of direct-fired burners or the plurality of regenerative combustors, or the plurality of heat exchangers. The invention relates also to a selecting method of a porous heat accumulating body for achieving uniform substantial average surface pore diameters of the porous heat accumulating bodies in the plurality of direct-fired burners, or the plurality of regenerative combustors, or the plurality of heat exchangers. Furthermore, the invention relates to a component member of a used porous heat accumulating body used so that the substantial average surface pore diameters of the porous heat accumulating bodies are not uniform for the plurality of direct-fired burners, or the plurality of regenerator combustors, or the plurality of heat exchangers.

2. Description of the Related Art

Unless otherwise discriminately referred to, a pore and a pseudo-pore (see the definition described later) will be generically referred to as "pores". A heat exchanger having a built-in porous heat accumulating body will be referred to as a "regenerative heat exchanger" (or simply referred to as a "heat exchanger", depending upon context) for convenience's sake so far as a gas flows through this heat accumulating body, irrespective of whether or not the heat accumulator is directly used for heat exchange of the heat exchanger.

1. Choking of Porous Heat Accumulating Body

There is well known a heat treatment equipment which is provided with a heating chamber having a plurality of regenerative combustors or regenerative heat exchangers each having a regenerative burner having a built-in porous heat accumulating body, and applies a heat treatment to an object in this heating chamber.

During operation of a heat treatment equipment of this kind, the porous heat accumulating body carries out heat exchange through alternate passage of a low-temperature gas and a high-temperature gas. The porous heat accumulating body is therefore exposed naturally to the severe heat shock environment, and also to a mechanical pressure caused by the passing gas under a thermal environment. Depending upon the kind of heat treatment carried out in the heating chamber, the porous heat accumulating body may be exposed to severe chemical reactions. Therefore, the porous heat accumulating body is required to be made of a stable material capable of bearing use in such a severe environment. Such a requirement does not however always assume presence of a heating chamber or a combustion burner, and is a technical requirement to be naturally satisfied when a regenerative heat exchanger is used in a severe environment. For example, when heat exchange is conducted through a porous heat accumulating body using a by-product gas from an industrial furnace as a high-temperature source, this applies if conceiving the industrial furnace itself as a "heating chamber" is not natural (a definition of the term "heating chamber" will be given in detail later).

The service life of a porous regenerator used in a heat treatment equipment is not endless. Since it is used under severe conditions, it is inevitable to periodically or non-periodically replace the porous regenerator. The period of replacement becomes shorter also for other reasons. For example, substances brought from outside the heat treatment equipment into the heating chamber (exogenous off-purpose substances) or substances brought into the heating chamber from members within the heat treatment equipment (including members themselves composing the porous regenerator) (endogenous off-purpose substances) are subjected to a heat treatment in the heating chamber, or chemically react with environmental substances in the heating chamber, or materials themselves of the porous regenerator react with other substances in the heating chamber, resulting in by-products, or these off-purpose substances do not fully change into by-products and remain in the heating chamber temporarily or for a long period of time in the non-reacting form. These by-products or residual off-purpose substances occur or deposit in the pores of the porous regenerator, causing choking or clogging of pores (hereinafter referred to as "choking" or the porous regenerator for convenience sake), resulting in deterioration of properties and quality of the porous regenerator with the lapse of time in service as compared with an originally expected level. As a result, a sudden increase in gas pressure is caused in the heating chamber, and combustion efficiency of a direct-fired burner, heat exchange efficiency of a regenerative heat exchanger, or performance as a whole also decreases, thus impairing efficient operation of the heat treatment equipment. In terms of the place for installation of the regenerative heat exchanger, if substances brought from outside into the place are considered exogenous substances, and substances coming from materials within the place as by-products are considered endogenous substances, the aforementioned phenomena illustrated as examples are directly applicable to a regenerative heat exchanger not requiring a heating chamber.

It thus becomes necessary to replace the porous regenerator. Unless choking of the porous regenerator is effectively prevented or inhibited, extending the service life is limited, so that the period for maintenance work such as inspection, maintenance, replacement, cleaning and the like of the porous regenerator cannot be increased to be over a certain level. This means that the frequency of these maintenance operations cannot be reduced to be under a certain level.

The easiest method for preventing or inhibiting choking of the porous regenerator is to conduct maintenance works more frequently such as periodical or non-periodical inspection, maintenance, replacement, cleaning and the like of the porous regenerator, placing too much importance on safety of the heat treatment equipment, assuming from the very beginning a limited service life of the porous regenerator, i.e., a life shorter than the actual one. It is true that frequent maintenance works of the porous regenerator would solve the problem of choking.

However, this causes an increase in the cost for maintenance works (including personnel cost and overhead). For example, a porous regenerator is unavailable without compensation. The increase in the replacement frequency of the porous regenerator is directly associated with the increase in maintenance and management cost of the heat treatment equipment. Even when maintenance is required only for some porous regenerators, it is sometimes necessary to discontinue operation of the heat treatment equipment. As a result, this leads to an increase in frequency of maintenance operations, causes troubles in operation of the heating equipment, and poses problems in operating cost.

Therefore, in order to solve a series of problems as described above caused by choking of the porous regenerator (hereinafter referred to as the "choking problem of porous regenerator" for convenience sake), it is necessary to contrive a technique capable of reducing the replacement frequency of the porous regenerator as far as possible. A porous regenerator achieved by such a technique should provide a higher cost curtailing effect than ever upon replacement after expiration of service life.

2. Progress of Choking and Substances Causing Choking

Off-purpose substances or heat treatment by-products (hereinafter generically referred to as "substances causing choking") causing the choking problem of the porous regenerator are visible by naked eyes in some cases, or visible only through a microscope in some others. However, choking of the porous regenerator becomes more serious with the lapse of time, thus reducing the bore diameter of the pore. Presence and the degree of progress of choking can therefore be known from a change with time in the bore diameter of pore. Progress of choking causes a change in pressure or pressure loss of the gas flowing through the porous regenerator. Presence and the degree of progress of choking is therefore determinable through observation of this change. Irrespective of possibility to observe by naked eyes, presence and the degree of progress of choking can be known by setting an appropriate parameter. In the present invention, this parameter is comprehensively defined by use of a term "substantial average surface pore diameter".

A typical example of exogenous off-purpose substances is dust comprising metals, ceramics, glass, oxides and the like present around the heat treatment equipment. Dust is hard-reactive in many cases. A substance, which, if not hard-reactive, produces detrimental by-products as a result of heat treatment, is as well included among exogenous off-purpose substances. Furthermore, substances contained in a fuel or combustion air for a direct-fired burner may also be considered to fall under the category of exogenous off-purpose substances. Particularly, when intentionally mixing powder or a solid, (for example, a solid fuel) with a fuel, and such powder or solid is not fully burnt but remains, the residue falling under this category. Some of such residues tend to promote generation of the above-mentioned by-products.

A typical example of endogenous off-purpose substances is a powdery or flaky residue produced as a result of wear or breakage of a porous regenerator through mechanical contact during service or an off-purpose substance produced as a result of application of a heat treatment to an object of treatment charged in a heating chamber. Examples of the latter, i.e., off-purpose substances coming from an object of treatment are oxides and other scale generated on the surface of the object of treatment as a result of a heat treatment in a heating chamber, comprising small particles separated from the object surface under the effect of mechanical pressure or heat shock of gases passing through the heating chamber or other environmental conditions (Japanese Unexamined Patent Application Publication No.7-119958). When arranging direct-fired burners or regenerative heat exchangers in an array shape, substances coming from component members of the porous regenerator (particularly, powdered substance described later) arranged in the former stage may be endogenous (exogenous in some configurations of the equipment) off-purpose substances for the porous regenerator arranged in the latter stage.

Off-purpose substance remaining in the heating chamber may physically clog off pores of the porous regenerator after the lapse of some time. Softening, melting or evaporation caused by heat in the heating chamber (chemical reactions in a sense) may promote clogging of pores of this porous regenerator. A low-temperature gas flows through the regenerator. Particularly when discontinuing equipment operation for maintenance operation, there occurs a decrease in temperature of the regenerator. In such a case, the off-purpose substance having once softened, melted or evaporated hardens, solidifies or condenses, clogging off the pores of the porous regenerator, thus causing the "choking problem".

Comparison of a honey-comb type regenerator (defined later) and a ball type regenerator (defined later) reveals that, while in the former, the gas smoothly passes through straight pores, pores have non-straight portions in the latter, leading to a nonuniform gas flow rate which causes a serious decrease locally in the gas flow rate, resulting in easy stagnation or precipitation of off-purpose substances (particularly dust, and powdery or flaky residues). With at least the non-straight pores in view, however, the ball type regenerator tends to have a larger substantial average surface pore diameter as compared with the honey-comb type regenerator. Therefore, even if off-purpose substances tend to easily stagnate or precipitate at portions, the "choking" is not always more apparent in the ball type regenerator.

By-products are considered in many cases to result from chemical reactions at least between two substances from among exogenous or endogenous off-purpose substances, materials of the porous regenerator (for example, small amounts of compositions or impurities) and environmental substances in the heating chamber. These chemical reactions must have an important correlation with heat treatment conditions in the heating chamber (for example, contents and composition of the burner fuel, heat treatment temperature and heat treatment atmosphere). When a reaction generating by-products occurs in a porous regenerator, particularly on the surface thereof, the by-products gradually clog up pores of the porous regenerator. When there are exogenous or endogenous off-purpose substances in contact with the surface of the porous regenerator, for example, when there are off-purpose substances stagnating or precipitation as described above, by-products are slowly generated on the contact interface of the both, grow, and may accelerate choking of pores of the porous regenerator by off-purpose substances. Also, it is possible that heat treatment atmosphere may accelerate generation of by-products. This applies, for example, to a case where as substance of a low cleanliness such as a by-product gas of an industrial furnace including a blast furnace is used as fuel. When using a substance of a relatively high cleanliness such as a natural gas is used as fuel, unlike a by-product gas of an industrial furnace, "choking" caused by a by-product is not relatively serious. However, even when using a fuel material of a high cleanliness, "choking" may be caused by any other substance capable causing the same.

To judge from the definition of the above-mentioned endogenous off-purpose substance, i.e., "an off-purpose substance resulting from heat treatment applied to an object of treatment bought into the heating chamber", it would be reasonable to consider a by-product to fall under the category of endogenous off-purpose substances. This member of reasoning provides an advantage of permitting collective explanation of substances causing "choking", irrespective of what cleanliness a fuel material has. In the following description therefore, by-products are included in the category of endogenous off-purpose substance unless otherwise defined.

3. Conventional Art Solving "Choking Problem"

For the purpose of solving the problem of choking of porous regenerators, there have conventionally been available the following technologies:

(1) Dividing the regenerator into a plurality of layers, and forming the layer on the combustion gas inlet side so as to be replaceable from time to time (Japanese Unexamined Patent Application Publications Nos. 6-201276 and 8-94066).

(2) Providing a cyclone type dust collector on the waste gas inlet side of the regenerating chamber containing the regenerator and centrifugally separating scale and dust contained in waste gas (Japanese Unexamined Patent Application Publications Nos. 6-241420 and 7-119958).

(3) For reducing the concentration of NOx produced by a heat treatment, rinsing the regenerator by water or steam supplied through the regenerator into the heating chamber, and taking out substances tending to clog up pores without stopping the equipment or removing the regenerator for periodical or non-periodical maintenance work (Japanese Examined Patent Publication No. 4-70554).

(4) Providing a low-boiling-point metal catcher behind the waste gas outlet of a regenerator repeating passage of a combustion waste gas and combustion air in mutually reverse directions, and operating the heat treatment equipment so as to keep the waste gas temperature at regenerator exit at a level over the boiling point of the low-boiling-point metal so that condensation of the low-boiling-point occurs outside the regenerator (Japanese Unexamined Patent Application Publication No. 8-261421), or, providing a mist catcher in the middle of the waste gas channel connected to the regenerator (Japanese Unexamined Patent Application Publication No. 8-86419).

(5) In a regenerative continuous combustion burner of a type of causing continuous combustion of a single combustion burner by rotating a regenerator relative to the combustion air feed system and the exhausting system, providing reproducible high-melting-point and low-melting-point metal catching columns in the gas channel of the regenerator (Japanese Unexamined Patent Application Publication No. 8-86419).

(6) Dividing the heating chamber into upper and lower portions by means of a partition having a plurality of gaps to form a combustion chamber in which the burner actually produces flame and a melting chamber in which the object of treatment melts, and discharging dust or a low-boiling-point metal produced in the melting chamber through an auxiliary flue provided in the melting chamber located below the heating chamber to prevent inflow of these substances into the combustion chamber communicating with the regenerator (Japanese Unexamined Patent Application Publication No. 7-113579).

(7) Providing a regenerative alternate combustion burner at a position isolated from the flue to perform control so that a part of the combustion waste gas is discharged outside from the flue without passing through the regenerator to ensure that only the combustion waste gas mainly comprising a gas not containing a low-boiling-point metal passes through the regenerator (Japanese Unexamined Patent Application Publication No. 8-247430).

(8) Preventing production of (excessive) scale causing choking, by heat treating the object of treatment in an environment free from oxidation or with low oxygen (Japanese Unexamined Patent Application Publications Nos. 8-159664 and 7258740), or preventing the flame of the direct-fired burner from coming into contact with the object of treatment (Japanese Unexamined Patent Application Publication No. 7-102313).

Apart from the above, the techniques of preventing rapid heating of the object of treatment and preventing cracks or bending of the object of treatment by providing a preheating chamber of the object of treatment in the heat treatment equipment (Japanese Unexamined Patent Application Publication No. 8-210780), in the sense of preventing granulation or dispersion of once produced scale, and the technique of reducing the quantity of produced scale by adjusting the gas pressure in the heating chamber (Japanese Unexamined Patent Application Publication No. 7-103461) can be a counter measure against the choking problem of porous regenerator.

Among other conventional technologies, the conventional art (1) is noteworthy as a proposal of an approach for solving the choking problem by making contrivances about the form of the porous regenerator itself to facilitate replacement of the regenerator surface layer in which choking has occurred, on the basis of findings that, in a direct-fired burner in which a combustion gas is introduced directly into a burner, endogenous substances such as scale of the high-temperature object of treatment or dust of pieces of refractory frequently comes in through pores of the porous regenerator, together with combustion waste gas, and adhere there, and such deposition largely occurs in the surface layer having a sufficient width on the combustion waste heat inlet side.

However, this does not relate to a technology for preventing or inhibiting the choking phenomenon itself. Particularly, this conventional art is a technology of transforming a surface layer of a porous regenerator guilt in a standalone regenerative burner or regenerative heat exchanger into a different shape or configuration, but has no relationship with a technical idea comprising contrivances about the form of a porous regenerator itself based on new findings about choking behavior in a plurality of regenerative burners or a plurality of regenerators in a regenerative heat exchanger.

From the point of view of a technology for preventing or inhibiting choking phenomenon itself, the conventional arts (2) to (8) are rather closer to the object than the conventional art (1). These conventional arts have, however, no relationship with a technology of preventing or inhibiting the choking phenomenon itself, paying attention to the form of the porous regenerator, and as in the case of the conventional art (1), have no relationship with a technical idea comprising contrivances about the form of a porous regenerator itself based on new findings about choking behavior in a plurality of regenerative burners or a plurality of regenerators in a regenerative heat exchanger.

The present invention was developed in view of a specific choking phenomenon in a plurality of regenerative burners or a plurality of porous regenerators in a regenerative heat exchanger installed in a heating chamber or a particular space in a heat treatment equipment, and has an object to solve the problem of choking of a porous regenerator by making contrivances about the form of the regenerator itself.

DISCLOSURE OF INVENTION

A first aspect of the present invention provides a heat treatment equipment comprising a heating chamber having a plurality of regenerative combustors having direct-fired burners each having a porous regenerator built therein; wherein the porous regenerators in the plurality of direct-fired burners or the plurality of regenerative combustors have different substantial average surface pore diameters.

A second aspect of the invention provides a heat treatment equipment according to the first aspect of the invention, wherein a temperature gradient is applied to an object in the heating chamber.

A third aspect of the invention provides a heat treatment equipment according to any one of the aspects 1 and 2 of the invention, wherein the object is carried in the heating chamber, and/or carried out from the heating chamber.

A fourth aspect of the invention provides a heat treatment equipment which corresponds to the heat treatment equipment according to the first aspect of the invention, showing selectively variations in which the substantial average surface pore diameters of the porous regenerators are "not uniform". These variations include a case where the substantial average surface pore diameter of the porous regenerators of a first and a second direct-fired burners or regenerative combustors arranged in a first area in the proximity of the path entry and a second area not in the proximity thereof is larger for the first direct-fired burner than for the second direct-fired burner, and a case where it is larger for the first regenerative combustor than for the second regenerative combustor. The "path entry" in this fourth aspect of the invention includes the entry through which the object is carried in the heating chamber and/or the exit through which the object is carried out from the heating chamber.

A fifth aspect of the invention, while being similar to the fourth aspect in that the subject is a heat treatment equipment, is different from the fourth aspect in that the path entry of the heating chamber of the heat treatment equipment serves as an entry through which the object to be heat-treated is carried in the heating chamber from outside and as an exit through which the heat-treated object is carried out from the heating chamber, and a third area provided which is different from the first area in the proximity of the entry and the second area in the proximity of the exit, first, second and third direct-fired burners or regenerative combustors being arranged in these areas, respectively. In this heat treatment equipment of the fifth aspect of the invention the substantial average surface pore diameter of porous regenerator is not uniform between the first and second, between the first and third, or between the second and third direct-fired burners or regenerative combustors, or larger for the first direct-fired burner than for the second direct-fired burner, for the first direct-fired burner than for the third direct-fired burner, or for the second direct-fired burner than for the third direct-fired burner, or larger for the first regenerative combustor than for the second regenerative combustor, for the first regenerative combustor than for the third regenerative combustor, or for the second regenerative combustor than for the third regenerative combustor.

A sixth aspect of the invention provides an installing method of a porous regenerator built in a direct-fired burner provided in each of a plurality of regenerative combustors attached to a heating chamber in which a heat treatment is applied to an object carried in from outside; wherein the porous regenerators an installed in the plurality of direct-fired burners or regenerative combustors so that the substantial average surface pore diameters thereof are different from each other.

The installing method of a porous regenerator of a seventh aspect of the invention is a variation of the sixth aspect of the invention, wherein the heating chamber has a path entry accessible to outside, and a porous regenerator is installed so that the substantial average surface pore diameter for the porous regenerators of a first and a second direct-fired burners or regenerative combustors arranged in a first area in the proximity of the path entry and a second area not in the proximity thereof is not uniform; or is larger for the first direct-fired burner than for the second direct-fired burner; or is larger for the first regenerative combustor than for the second regenerative combustor.

An eighth aspect of the invention covers a method of manufacturing an object heat-treated by operating a specific heat treatment equipment and causing the object to pass through a heating chamber of the heat treatment equipment. The heating chamber is provided with a plurality of regenerative combustors each having a direct-fired burner having a built-in porous regenerator. A heat treatment is applied to the object by arranging the object carried in from outside and/or carried out to outside in a heating chamber, so that the substantial average surface pore diameter of the porous regenerators in the plurality of direct-fired burners or the plurality of regenerative combustors is not uniform.

A ninth aspect of the invention provides a method which corresponds to the method according to the eighth aspect of the invention, showing selectively variations in which the substantial average surface pore diameters of the porous regenerators are "not uniform". Theses variations include a case where the substantial average surface pore diameter of the porous regenerators of a first and a second direct-fired burners or regenerative combustors arranged in a first area in the proximity of the path entry and a second area not in the proximity thereof is larger for the first direct-fired burner than for the second direct-fired burner, and a case where it is larger for the first regenerative combustor than for the second regenerative combustor. The "path entry" in this ninth aspect of the invention includes the entry through which the object is carried in the heating chamber and/or the exit through which the object is carried out from the heating chamber as in the interpretation shown in the fourth aspect of the invention.

A tenth aspect of the invention provides a heat treatment equipment having a space provided with a plurality of heat exchangers each having a built-in porous regenerator along a flow direction of gas, wherein the substantial average surface pore diameters of the porous regenerators in the plurality of heat exchangers are not uniform.

An eleventh aspect of the invention provides a heat treatment equipment according to the tenth aspect of the invention, wherein the substantial average surface pore diameter is larger for the porous regenerator arranged in the upstream in the flow direction of gas than for the porous regenerator arranged in the downstream thereof; or, the substantial average surface pore diameter is larger for the porous regenerator arranged on the high-temperature side of the temperature of the flowing gas than for the porous regenerator on the lower-temperature side thereof.

A twelfth aspect of the invention provides an installing method of a porous regenerator in a heat treatment equipment provided with a space having a plurality of heat exchangers attached thereto each having built-in porous regenerator arranged along the flow direction of gas; wherein the porous regenerators are installed so that the substantial average surface pores of the porous regenerators in a plurality of heat exchangers are not uniform.

A thirteenth aspect of the invention covers a manufacturing method of an object heat-treated in a heating chamber of a heat treatment equipment by operating the specific heat treatment equipment. This heat treatment equipment has a space in which a plurality of regenerative heat exchangers each having a built-in porous regenerator is arranged along the flow direction of gas, and setting is such that the substantial average surface pore diameter is not uniform for the porous regenerators in the plurality of regenerative heat exchangers. A heat treatment is applied to the object by arranging the object carried in from outside and/or carried out to outside in the heating chamber, thereby manufacturing the heat-treated object.

A fourteenth aspect of the invention provides a heat treatment equipment provided with a heating chamber having a plurality of regenerative combustor each having a direct-fired burner having a built-in porous regenerator, wherein the substantial average surface pore diameter of the porous regenerators in the plurality of direct-fired burners or a plurality of regenerative combustors is larger for the one arranged at a lower position in the vertical direction.

A fifteenth aspect of the invention provides a heat treatment equipment, wherein a plurality of heat exchangers each having a porous regenerator through which a gas flows; and the substantial average surface pore diameter of the porous regenerator in the plurality of heat exchangers is larger for the one arranged at vertically lower position.

A sixteenth aspect of the invention provides a selecting method of a porous regenerator to be built in a direct-fired burner or a heat exchanger provided in a regenerative combustor, comprising the steps of measuring a decrease in the substantial average surface pore diameter of the porous regenerator occurring along with a increase in the operating period of time of the regenerative combustor or the heat exchanger, and building, in the direct-fired burner or the heat exchanger, a porous regenerator having a substantial average surface pore diameter calculated by previously adding a value corresponding to the difference between the thus measured valued and a target value.

A seventeenth aspect of the invention provides a component member of a used porous regenerator used by being built in a direct-fired burner provided in each of a plurality of regenerative combustor installed in a heating chamber provided in a heat treatment equipment, and having subsequently become used, wherein the substantial average surface pore diameter is not uniform for the porous regenerators prior to starting use thereof.

An eighteenth aspect of the invention provides a component member of a used porous regenerator according to the seventeenth aspect of the invention, wherein the choking rate defined as a change rate of the substantial average surface pore diameter of a porous regenerator during operating period of a heat treatment equipment of over 540 days is at least 50%.

A nineteenth aspect of the invention provides a component member of a used porous regenerator according to the seventeenth aspect of the invention, wherein the choking rate defined as a change rate of the substantial average surface pore diameter of a porous regenerator during operating period of a heat treatment equipment of over 800 days is at least 60%.

BRIEF DESCRIPTION OF THE DRAWINGS

FIG. 6 descriptive view of a unit cell of a honey-comb type regenerator: (a) is a perspective view of the regenerator; (b) is a perspective view of component members of the porous regenerator; and (c) is a descriptive view of the sectional area of a pore of the unit cell.

FIG. 22 illustrates a temperature profile in the heating chamber of another heating surface and changes therein.

FIG. 23 is a descriptive view of choking phenomenon in the upper furnace and the lower furnace of another heating furnace.

FIG. 24 illustrates the relationship between the choking rate or the regenerator replacement frequency and the operating time in another heating furnace.

FIG. 25 is a descriptive view illustrating an arrangement of the regenerative combustors: (a) and (b) are plan views, and (c) and (d) are sectional views.

FIG. 26 is a descriptive view illustrating another arrangement of the regenerative combustors: (a) and (b) are plan views, and (c) and (d) are sectional views.

BEST MODE FOR CARRYING OUT THE INVENTION

Figure 1:
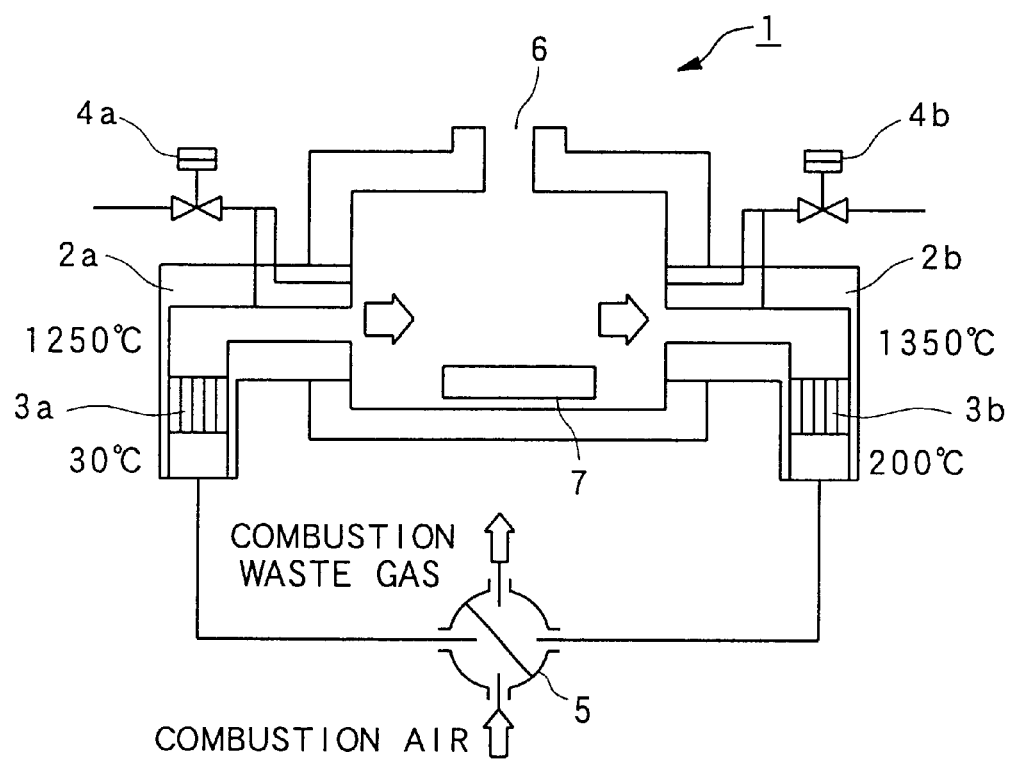
FIG. 1 is a schematic longitudinal sectional view illustrating a heating furnace.

First, the terms in the present invention will be defined.
1. "Porous Regenerator":

The term "porous regenerator" means a structure which comprises one or more members, has a regenerative function as a whole, and is provided with a plurality of connection paths of pores or gaps deemed as pores (hereinafter referred to as "false pores"). The individual members may have any of various shapes including a block shape, a ball shape, a flake shape and a nugget shape (for example, Japanese Unexamined Utility Model Registration No. 7-2739 and Japanese Unexamined Patent Application Publication No. 8-94066).

From the point view of "porous", "pores" or "false pores", a honey-comb-shaped member itself has many pores, and can serve as a porous regenerator in the present invention. However, when using a collection of a plurality of honey-comb members as a whole as a regenerator (for example, Japanese Unexamined Patent Application Publications Nos. 7-280239, 8-247671, and 7-39761, and Japanese Unexamined Utility Model Registration No. 7-2739), the collection is recognized as a porous regenerator. This is also the case with a corrugated member (for example, "Application of Performance and Reliability Concepts to Design of Ceramic Regenerator", published by Ford Motor Co., 1977).

In the case of a regenerator comprising a honey-comb-shaped member, a corrugated member, or a collection thereof (hereinafter generally referred to as "honey-comb type regenerator"), pores usually linearly pass through the body in the longitudinal direction, with a uniform cross-section in most cases, such as rectangular (for example, Japanese Unexamined Patent Application Publication No. 10-122517, Japanese Utility Model Registration No. 3049065) in many cases, but not limited to this, triangular (for example, Japanese Unexamined Patent Application Publication No. 55-46338), hexagonal (for example, Japanese Examined Patent Publication No. 739913), polygonal (for example, Japanese Unexamined Patent Application Publication No. 7-39761), substantially semicircular, substantially sinusoidal or wavy ("Programs regarding Design and Reliability of Ceramic Regenerator for Automobile Gasoline Turbine", published by Ford Motor Co., United States, October 1976; Journal "Chemical Plant", March 1983, p.59–66).

A ball-shaped member is, on the other hand, only rarely used as a regenerator, and usually a collection of ball-shaped members is used as a regenerator (for example, Japanese Unexamined Patent Application Publications Nos. 10-176815, and 10318529). In a collection of ball-shaped members, false pores are formed by connection of gap spaces between ball members. In this case, the false pores are not always linear in shape, and the cross-section is not constant, varying with the ball diameter, a combination of different ball diameters, or mixture of ball-shaped members of different shapes. This is also the case with mixture of ball-shaped members and honey-comb members (for example, Japanese Unexamined Patent Application Publications Nos. 7-127983 and 10-115408). In an area where honey-comb members are present, while pores may be linear, in an area containing ball-shaped members, pores are not necessarily straight. When a regenerator is formed by collecting many small-lump honey-comb members (for example, Japanese Unexamined Utility Motel No. 7-2739), although pores may be straight relative to individual members, non-linear false pores are formed by spatial connection of gaps between members. A regenerator having a plurality of false pores, provided with a porous structure (for example, Japanese Examined Patent Publication No. 4-70554), falls under the category of porous regenerators. These porous regenerators having false pores formed therein shall be hereinafter referred to collectively as "ball type regenerators").

However, because the small-lump honey-comb member itself acts as a honey-comb type regenerator, more accurately, such a honey-comb member falls under the category of honey-comb type regenerators.

Eventually, therefore, presence of many pores or false pores is the minimum condition for being a porous regenerator, and factors useful for the object, operation and advantages of the present invention, whether the form and manner of collection of members or form of pores or false pores, are not excluded.

It is difficult to determine a standard for judging whether or not there are "many" pores or false pores, but the member of pores or false pores should be at least two, not providing an upper limit. In this case also, the standard is whether or not a factor is for the object, operation and advantages of the invention, to determine whether or not there are "many" pores or false pores.

Since a porous regenerator is a structure to be incorporated into a prescribed place of prescribed equipment, there are imposed physical restrictions such as a certain volume, shape, size and weight, and furthermore, there should be required to exhibit desired quality and properties including mechanical strength, resistance to thermal shock and heat resistance within the range of these restrictions. Actually, therefore, the shape and size of pores in the sectional direction or in the longitudinal direction of pores of a porous regenerator or individual members forming the porous regenerator are not unlimited.

There are also a regenerator having a catalytic function available (for example, Japanese Unexamined Patent Application Publications Nos. 7-127983 and 7-47233). However, for the definition of the porous regenerator, presence of such an additional function is not an important issue in the present invention.

2. "Regenerative Heat Exchanger":

A regenerative heat exchanger means an apparatus which alternately conducts waste gas recovery of high-temperature gas and preheating of low-temperature gas by means of a regenerator by alternately switching over supply and discharge of a low-temperature gas and a high-temperature gas (for example, Japanese Unexamined Patent Application Publications Nos. 7-127983, 7-83585, 7-47233, 6-313508, 6-257972, 6-213585, and 5-340683 and Japanese Unexamined Utility Model Publication No. 7-2739).

The direct-fired burner described later, which is built by the combination of a combustion burner and a regenerative heat exchanger, can be considered to be a kind of regenerative heat exchanger. In any of the embodiments of the invention, however, it is not necessary that the regenerative heat exchanger is combined with a combustion burner as is a direct-fired burner described later. In a direct-fired burner, waste heat of the high-temperature combustion gas occurring from the combustion burner is collected through a regenerative heat exchanger combined therewith. The regenerative heat exchanger in this embodiment suffices to be installed in a space permitting heat exchange. It may be installed separately from the combustion burner, and it is not necessary to use the combustion burner as a heat source. Waste heat collection of the produced high-temperature gas may be achieved by means of a separate heat source (for example, Japanese Utility Model Registration No. 3049065).

3. "Direct-Fired Burner Having Built-in Regenerator"):

The term "a direct-fired burner having a built-in regenerator" (hereinafter simply referred to as a "direct-fired burner" for convenience' sake) means an apparatus which is formed by the combination of a combustion of combustion burner and generative heat exchanger (for example, Japanese Unexamined Utility Model Publication No. 7-2739) in which a gas in the site containing the object of treatment is movable through the regenerator. According to such an apparatus based on the combination of the combustion burner and regenerative heat exchanger, it is possible to alternately perform waste heat collection of combustion gas and preheating of combustion air through the regenerator. Energy saving, high-efficiency transmission, high-efficiency waste heat collection and reduction of NOx are therefore achievable as generally known.

Typical examples of the "direct-fired burner having a built-in regenerator" in the present invention include the so-called regenerative alternate combustion burner which alternately conducts waste heat collection of combustion gas and preheating of combustion air through a regenerator connected to, or incorporated in, the combustion burner by alternately burning a pair of combustion burner (for example, Japanese Unexamined Patent Application Publications Nos. 8-247671, 6-228632, 7-280208 and 10-176815), and the so-called regenerative continuous combustion burner in which combustion air preheated to a high temperature by use of waste heat of the combustion waste gas is continuously fed to a single combustion burner to cause continuous combustion by rotating the regenerator relative to the combustion air feed system and the exhaust system, or, switching over the flow direction of liquid to the regenerator by use of flow channel switching means (for example, Japanese Unexamined Patent Application Publications Nos. 8-166123, 7-119937, 7-27326, 5-256423, 7-113509, 6713508, Japanese Unexamined Utility Model Publication No. 6-65714, 63-159622, Japanese Unexamined Patent Application Publications Nos. 6-42730, 8-285266 and 7113509). The combustion burner used when causing alternate combustion of regenerative continuous combustion burners is not excluded from the category of the "direct-fired burner having a built-in regenerators" in the present invention.

In an embodiment of the invention, the above burner is limited to one having a structure in which gas in the site containing the object of treatment is movable through a regenerator, i.e., a "direct-fired burner". Therefore, a burner having a structure in which gas in the site containing the object of treatment does not move through a regenerator by using a heating tube or a radiant tube (for example, Japanese Unexamined Patent Application Publications Nos. 1-219412, 8-135936, 8-247420, 10-318528, and 10-115408) is not included in the category of "direct-fired burners" limited in an embodiment of the invention, irrespective of whether the type of combustion is regenerative alternate combustion or regenerative continuous combustion.

However, when the flame of the combustion burner is in direct contact with the object of treatment (for example, Japanese Unexamined Patent Application Publications Nos. 8-233251 and 7-258740), or even when the flame of the combustion burner is not in direct contact with the object of treatment (for example, Japanese Unexamined Patent Application Publications Nos. 7-113579, 8-246041 and 8-159664), a combustor in which gas in the site containing the object of treatment is movable through a regenerator is included in the category of "direct-fired burners", irrespective of the type of combustion or the direction of the flame axis of the burner.

The fuel, the combustion air composition and the presence of a mixture used in a direct-fired burner have no importance in this respect. Therefore, a liquid, a solid or an emulsion may be mixed in a fuel. Air may be or may not be enriched with oxygen. The level of cleanliness of fuel or air pores no problem.

In the present invention, it is needless to mention that the regenerator is limited to a porous regenerator.

4. "Regenerative Combustor Having Direct-Fired Burner Having a Built-in Regenerator":

A regenerative combustor having a direct-fired burner having a built-in regenerator means a combustor provided with a direct-fired burner having the above-mentioned built-in regenerator.

The number of direct-fired burners forming a single regenerative combustor varies with the type of combustion of the direct-fired burner. For example, a pair of (two) regenerative alternate combustion burners, one regenerative continuous combustion burner, or a pair of (two) regenerative continuous combustion burners alternately burnt form a single regenerative combustor, respectively. If there are a pair of regenerative alternate combustion burner and a regenerative continuous combustion burner, there would be two regenerative combustors.

5. "A Plurality of Regenerative Combustors", "a Plurality of Regenerative Heat exchangers":

Presence of a plurality of regenerative combustors includes at least the following types:

Type 1: When a regenerative combustor comprises only a regenerator alternate combustion burner or a regenerative continuous combustion burner performing alternate combustion, there are at least two pairs of (hence four) regenerative alternate combustion burners or regenerative combustion burners.

Type 2: When a regenerative combustor comprises only regenerative continuous combustion burners (not performing alternate combustion), there are at least two regenerative continuous combustion burners.

Type 3: When a regenerative combustor comprises regenerative alternate combustion burners or regenerative continuous combustion burners performing alternate combustion, and regenerative continuous combustion burners (not performing alternate combustion), there are at least a pair of (hence two) regenerative alternate combustion burners or regenerative continuous combustion burners performing alternate combustion, and at least one regenerative continuous combustion burner (not performing alternate combustion). In other words, there are at least two regenerative alternate combustion burners and at least one regenerative continuous combustion burner, or at least three regenerative continuous combustion burners.

Presence of a plurality of regenerative heat exchangers literally means presence of at least two of them. Since the regenerative combustor is an apparatus using porous regenerators as heat exchangers, it is included in the concept of "a heat exchanger having a built-in porous regenerator" in the claims of the present application, and the tenth to thirteenth and fifteenth aspects of the invention is construed with this concept in mind.

6. "Heating Chamber Having (a Plurality of Regenerative Combustors or Regenerative Heat Exchangers):

The term the "heating chamber" is a prescribed place, a space or a cell where a desired heat treatment is applied to an object of treatment, provided with a "heat treatment equipment" described later. A heating chamber is referred to as a combustion chamber in some cases (for example, Japanese Unexamined patent Application Publication No. 8-159664). In an aspect of the invention, the heat source used heat treatment is a direct-fired burner of a regenerative combustor.

In other aspect of the invention, it should be noted that a regenerative heat exchanger not having a combustion burner is used. The place where the regenerative heat exchanger is to be installed is a place, a space or a cell where a heat exchange is conducted (hereinafter referred to as a "heat exchange chamber"), and is not required to be a prescribed place, space or cell where a desired heat treatment is applied to the object of treatment. In this sense of the word, the "space" having a plurality of regenerative heat exchangers in the tenth to thirteen aspects of the invention means a place, a space or cell expressing comprehensively a heat exchange chamber or the like discriminated from a heating chamber. The "gas" as used in the tenth to thirteenth aspects of the invention may be a gas discharged outside from the heating chamber where the heat treatment is applied to the object, or supplied from outside to the heating chamber, or may be a gas flowing from the heating chamber into the heat exchange chamber. The present invention is valid irrespective of the presence of a heating chamber, but since heat exchange is carried out by installing regenerative heat exchangers, it is quite natural that the invention is limited in terms of equipment. In the fifteenth aspect, therefore limitation covers up to the heat treatment equipment.

Even when introducing steam, an inert gas and other substances during heat treatment, a case with only a unit cell, or a case of a plurality of spaces or connection of a plurality of spaces (this may be considered as a case with only one unit cell) are not excluded from the concept of a heating chamber or a heat exchange chamber in the invention.

Plurality of regenerative combustors are attached to the heating chamber for the purpose of achieving a desired temperature distribution in the heating chamber, and causing a change in time of this temperature distribution from time to time. As a result, it is possible to give a prescribed temperature history to the object of treatment, and thus to apply a desired heat treatment. For example, when carrying the object of treatment from outside into the heating chamber or carrying out the same from the heating chamber, the object of treatment is exposed to a steep temperature change.

Thermal shock suffered from at this point may cause adverse effects on the subsequent heat treatment such as occurrence of a defect in the object, or adverse effects on the product quality of the heat-treated object. Usually, therefore, the operating conditions of the regenerative combustor are adjusted so that the temperature distribution in the heating furnace near the interface with outside changes slowly relative to the external temperature.

For some kinds of heat treatment, however, it is necessary to create a sudden temperature gradient in the heating chamber near the interface with outside or other heating chamber, and it is difficult in operation to avoid this in some cases.

When it is necessary to create a temperature gradient toward a desired target temperature, the temperature distribution in the heating chamber is adjusted through adjustment of the operating conditions of the individual regenerative combustors. When the heating chamber comprises connection of a plurality of unit cells, adjustment is made for each unit cell. Such adjustment can be accomplished static control in which the operating conditions of the individual regenerative combustors are kept constant, dynamic control in which, while measuring temperature by means of sensors provided outside the chamber or in the chamber or within the unit cells, or while monitoring operation of another regenerative combustor (for example, an adjacent regenerative combustor), the result is positively or negatively fed back, or any combination of static control and dynamic control. A computer in these controls in many cases, and if possible, a more primitive apparatus may be used for such control. In the invention, there is imposed no restriction on the method of creating a desired temperature distribution in the heating chamber.

The term "attachment" means arranging regenerative combustors or regenerative heat exchangers in general so that the gas in the heating chamber or the gas used for heat exchange is movable through the regenerators. More specifically, not limitative, "attachment" is a kind of installing combustors in the heating chamber. So far as combustors or heat exchangers are installed in the heating chamber so that in the presence of the object, specifically, the gas in the heating chamber becomes movable through the regenerators any method may be adopted, irrespective of the distance between the object of treatment and the regenerators arranged in the heating chamber or the form of the gas channel connecting the both. That is, it means arranging the regenerative combustors or the regenerative heat exchangers in a state in which the gas in the space formed by the heating chamber is movable through the regenerators. It includes arranging the same so that the regenerators face the space formed by the heating chamber, and arranging the same so that the regenerators face the space formed by the gas channel attached to the heating chamber, as well as arranging the same in a manner in which all or part of the main bodies of the combustors or the heat exchangers are buried in the wall of the heating chamber, and arranging the same while connecting main bodies of the combustors or the heat exchangers to the heating chamber with piping or gas channels.

The flow-direction of the gas flowing through the porous regenerators of the regenerative combustor or the regenerative heat exchanger may be constant or may be reversed. For example, even when the regenerative combustor attached to the heating chamber performs alternate combustion, if the gas outside the heating chamber flows into the heating chamber and the gas in the heating chamber flows out to outside, it is not necessary to reverse the direction of the gas flow in the regenerators. If contrivances are made in the gas piping and switching thereof, the flow channel of the gas flowing from outside the heating chamber into the heating chamber and the position of passage through the regenerators can be changed with a constant gas flow direction through the regenerators or without changing it into another direction or reversing the same. In the case of a regenerative heat exchanger attached to the heat exchange chamber, as well, if contrivances are made in the gas piping and switching thereof, the flow channel of the gas flowing from outside the heat exchange chamber into the heat exchange chamber and the position of gas passage through the regenerators can be changed with a constant gas flow direction through the regenerators or without changing it into another direction or reversing the same.

Types of arrangement of the plurality of regenerative combustors and/or regenerative heat exchangers include, for example, a type of array arrangement in the moving direction of the object of treatment (for example, Japanese Unexamined Patent Application Publications Nos. 7-4853, 8-210780 and 7-97617), a type of arranging the same on a wall (usually the furnace wall) forming the space in the heating chamber so as to surround that internal space (for example, Japanese Unexamined Patent Application Publication No. 6-94368), a type arranging the same in a path or a separate space corresponding to the path of the gas discharged from the heating chamber to outside (for example, Japanese Unexamined Patent Application Publication No. 53-120861), or along the separate space or so as to surround that separate space (for example, Japanese Utility Model Registration No. 3049065, and Japanese Unexamined Patent Applications Nos. 7-280239 and 7-258740). Among the array arrangement types, there is available a type of arranging in series a plurality of units or a plurality of zones with a group several regenerative combustors and/or regenerative heat exchangers (including a single case) as a unit or as a zone (for example, Japanese Unexamined Patent Application Publications Nos. 6-200329, 8-20934, 6-238317, 797617, and 8-159453). The type of arrangement in the invention is not limited to the above, but a type of arrangement in which burner flame axes cross and various other types of arrangement are widely covered.

7. "Heat Treatment Equipment" and "Path":

The term "heat treatment equipment" means any furnace to which the present invention is applicable or which is not excluded from application of the invention. For example, this applies to a heating furnace (for example, Japanese Unexamined Patent Application Publication No. 6-238317), an incinerating furnace (for example, Japanese Unexamined Patent Application Publication No. 10-197159), an ash melting furnace (for example, Japanese Unexamined Patent Application Publication No. 8-68519), a melting furnace (for example, Japanese Unexamined Patent Application Publication No. 10-246585), a heat treatment furnace, a socking pit and a molten metal holding furnace (for example, Japanese Unexamined Patent Application Publication No. 8-128620), a deodorizing furnace, a chemical reactor, and other industrial furnaces (for example, see the list of industrial furnace given in Japanese Unexamined Patent Application Publication No. 8-166123, and No. 8-166124). It is thus possible to conceive a kind of heat treatment equipment in response to the kind of heat treatment.

In the fifteenth aspect of the invention, it should be noted that, in some cases, only the heat treatment equipment is taken up for the necessity to limit to an equipment having regenerative heat exchangers. In this case, it makes no sense to limit concrete details of heat treatment equipment or the heat treatment carried out therein.

A heat treatment equipment comprises an entry and a carry-in path into which an object of treatment is carried from outside in heating chamber (i.e., a route through which the object of treatment is carried in), an entry section (an area including the entry and the proximity thereof) directly connected to the carry-in path provided in a heating chamber of the heat treatment equipment, an exit and a carry-out path for carrying out the object of treatment subjected to the heat treatment from the heating chamber to outside (i.e., the route through which the object of treatment is carried out), and an exit section (i.e., an area including the exit and the proximity thereof) in some heating chambers. An opening/closing door or an opening/closing apparatus may be provide in the carry-in path or the carry-out path (for example, Japanese Unexamined Patent Application Publication No. 6-238317). In this case, after carrying in the object of treatment in the heating chamber by opening the door on the carry-in path side, the heating chamber is isolated from outside by closing the door, and after carrying out the object of treatment subjected to a heat treatment to outside by opening the carry-out path side door, the heating chamber is isolated from outside.

In another heat treatment equipment, a gas channel (i.e., the route through which a gas flows) connecting the interior of the heating chamber to outside is provided, and there is a gas channel port provided (i.e., an area including an exit connecting the interior of the heating chamber to outside from among the routes through which gas flows and the proximity thereof or an entry and the proximity thereof) directly connected to the gas channel in the heating chamber. Examples of such a gas channel include a chimney, a flue and a duct for discharging the gas in the heating chamber to outside. This gas channel may be provided with an apparatus which connects the heating chamber to outside from time to time such as an opening/closing door or an opening/closing valve. In some types, the heating chamber is connected to outside as required by means of a dumper provided in the chimney or the like to control the gas pressure or specific gas partial pressure in the heating chamber by exhausting (for example, Japanese Unexamined Patent Application Publications Nos. 6-238317, 7-103361, 8-210780 and 6-200329).

The carry-in path or the carry-out path of the object of treatment, like the flue or duct forming a separate space from the heating chamber, forms a separate space from the internal space of the heating chamber in some cases (for example, Japanese Unexamined Patent Application Publications Nos. 8-210780, 7-258740, and 8-135936), or are integrated with the internal space of the heating chamber so that it is impossible to discriminate (for example, Japanese Unexamined Patent Application Publications Nos. 7-103659 and 6-200329). In such a case, even if a carry-in path or a carry-out path can be thought of conceptually, it is difficult to point out the same the actual locations thereof by specifically confining the same. For example, the entry through which the object of treatment is carried from outside into the heating chamber and the entry section which should be in the heating chamber are very close to each other and have a so-called back-to-back positional relationship. This is also the case with the relationship between the exit through which the object is carried from the heating chamber to outside and the exit section which must be in the heating chamber. In the present invention, it is regardless of whether or not the carry-in path and the carry-out path can actually be confined, or whether or not configuration is limited to only conceptual one.

The "path" is a route through which a substance or an object passes, and the "pass port" is an exit or an entry connecting a space and a separate space in a route crossing a plurality of spaces. The above-mentioned carry-in path, carry-out path, gas channel, entry section, exit section and gas channel port may be considered to fill under the category of paths and path ports in view of there functions. In the invention, therefore, the paths include the carry-in path, the carry-out path and/or the gas channel, and the path ports include the entry section, the exit section and/or the gas channel, unless otherwise discriminated by clear specification.

8. "Object to be Treated" and "Object":

In the present invention, the object to be treated and the object mean an object to be heat-treated or a heat-treated object, unless otherwise discriminated by clean specification. Examples of such object of treatment or object include metal ores, a slab, a bullet and other pieces of steel (for example, Japanese Unexamined Patent Application Publications Nos. 7-258740 and 8-143949), a metal strip (for example, Japanese Unexamined Patent Application Publications Nos. 8-159664 and 7-102326), a steel section (for example, Japanese Unexamined Patent Application Publications Nos. 7-97617 and 6-200328), incineration ash (for example, Japanese Unexamined Patent Application Publication No. 8-261421), swage sludge (Japanese Unexamined Patent Application Publications Nos. 7-280239 and 7-280475), glass (for example, Japanese Unexamined Patent Application Publications Nos. 6-94368 and 8-208240), and ceramics, plastics, raw wastes and wood and other combustible wastes, but are not limited to those mentioned above. For example, when heat-treating a waste gas for the purpose of removing detrimental substances, bad-odor substances, non-perfume substances or the like contained in the waste gas, the waste gas corresponds to the object to be treated or the object.

9. "Substantial Average Surface Pore Diameter of Porous Regenerator":

The "substantial average surface pore diameter of a porous regenerator" is a term specifically defined in the present specification, and will be described later in detail.

10. "Not Uniform":

The expression "the substantial average surface pore diameter of a porous regenerator is not uniform" means that, when there are at least two direct-fired burners each having a porous regenerator built therein or regenerative heat exchangers, or groups thereof, i.e., when there are a plurality of porous regenerators built in different direct-fired burners or an heat exchangers or groups thereof, and when comparing a porous regenerator built in a direct-fired burner of the heat exchanger or one of the groups with the other porous regenerator built in the direct-fired burner or the heat exchanger or the group thereof, the substantial average surface pore diameter of the porous regenerator is not a single value. More specifically, it can be explained as follows.

When there are two porous regenerators built in different direct-fired burners or heat exchangers, the above expression means that the substantial average surface pore diameter is different between the two porous regenerators.

When there are three or more (M) porous regenerators built in different direct-fired burners or heat exchangers, the substantial average surface pore diameters for all the M porous regenerators are not a single value, and this corresponds to the following cases:

While N (0<N<M−1) porous regenerators take a common substantial average surface pore diameter value, the remaining (M−N) porous regenerators take a common value different from the above;

The M porous regenerators are divided into P(2<P<M) groups taking different values of substantial average surface pore diameter (even a single porous regenerator taking a value is counted as a group);

All the M porous regenerators take values different from each other of the substantial average surface pore diameter.

The aforementioned explanation will be described more without limitative intention. If there are a plurality of porous regenerators belonging to different direct-fired burners or heat exchangers, and if there exist porous regenerators having a substantial average surface pore diameter small or larger than the others, the substantial average surface pore diameters of the porous regenerators may be considered "not uniform" in the invention.

Therefore, in view of the meanings of a direct-fired burner having a built-in porous regenerator, a regenerative combustor having such a direct-fired burner, and a regenerative heat exchanger having a built-in porous regenerator, a case where the substantial average surface pore diameter is larger for a direct-fired burner than for another direct-fired burner, a case where that diameter is larger for a regenerative combustor than for another regenerative combustor, and a case where that diameter is larger for a regenerative heat exchanger than for another regenerative combustor fall under the category of "not uniform". A case where, in a regenerative combustor having a pair of direct-fired burners performing alternate combustion, the substantial average surface pore diameter is different between the porous regenerator of one of the direct-fired burners and that of the other direct-fired burner is also included in the definition of "not uniform".

To illustrate the present invention further in detail without an intention to limit the invention, the heat treatment equipment having direct-fired burners or regenerative combustors with a heating furnace as an example will now be described with reference to the drawings.

Figure 2:
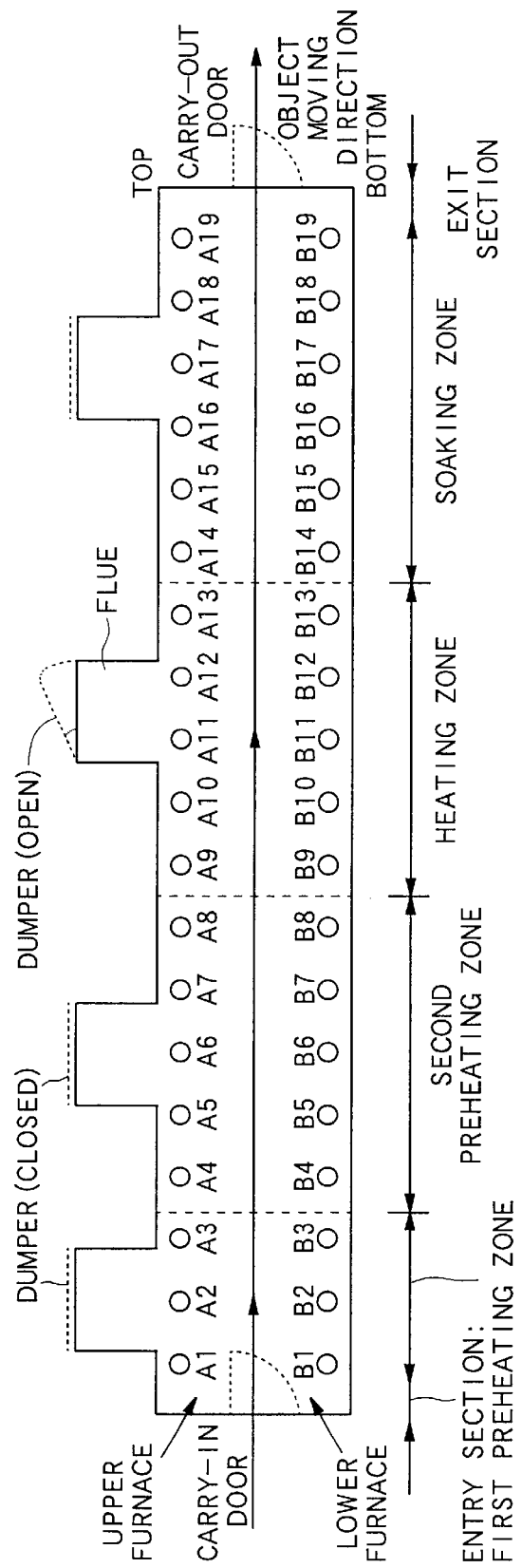
FIG. 2 is a schematic side view illustrating the heating furnace.
Figure 3:
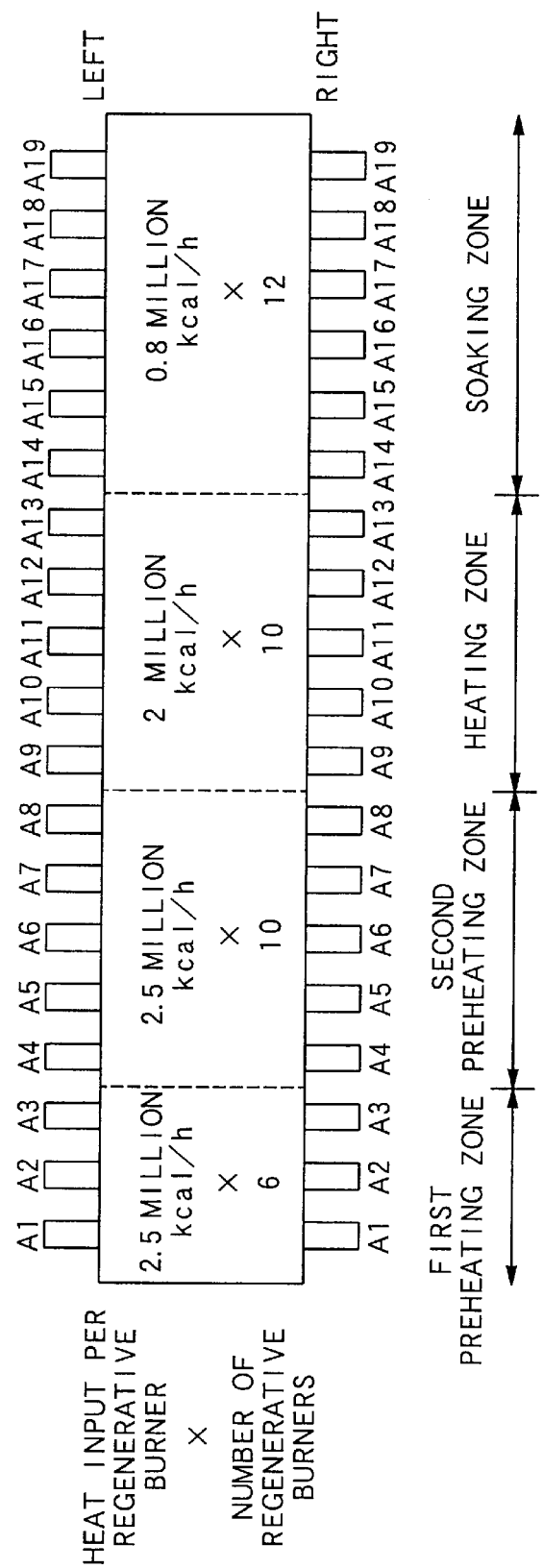
FIG. 3 is a schematic plan view illustrating the arrangement of burners in the upper furnace of the heating furnace.
Figure 4:
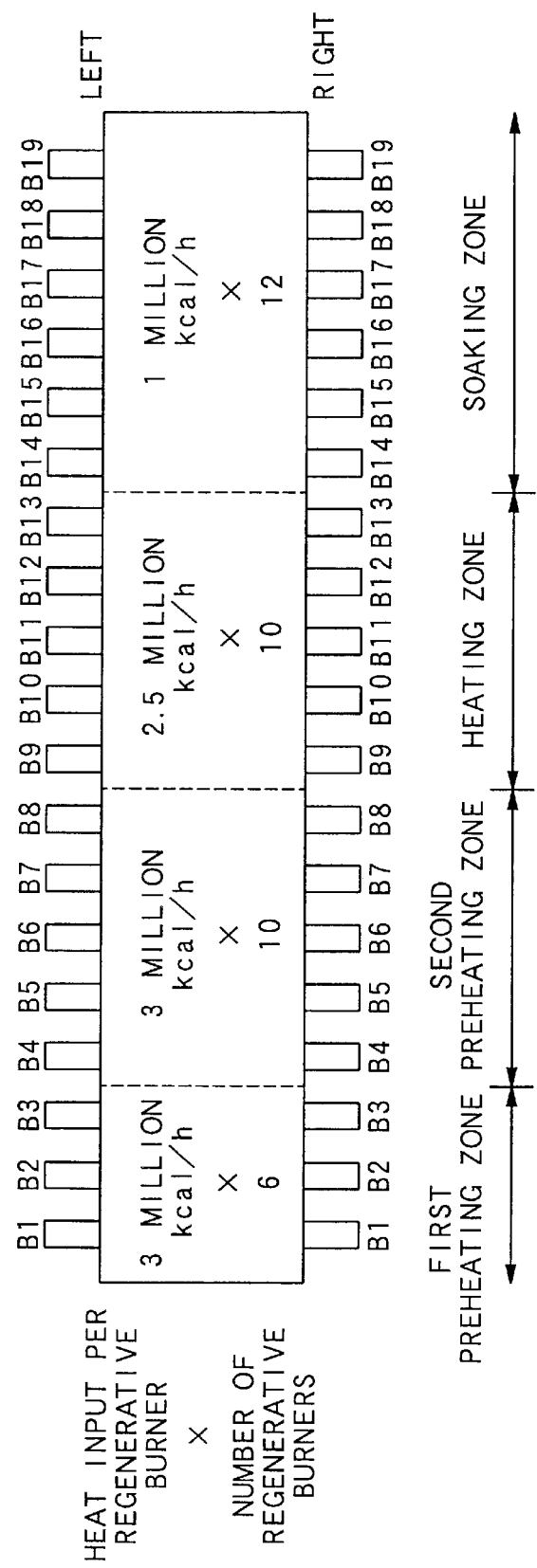
FIG. 4 is a schematic plan view illustrating the arrangement of burners in the lower furnace of the heating furnace.

FIG. 1 is a schematic longitudinal sectional view illustrating a heating furnace; FIG. 2 is a schematic side view illustrating the heating furnace; FIG. 3 is a schematic plan view illustrating a heating furnace having an upper burner shown; and FIG. 4 is a schematic side view illustrating the heating furnace having a lower burner shown.

In FIG. 1, 1 represents a heating furnace main body; 2a and 2b, direct-fired burners; 3a and 3b, regenerators; 4a and 4b, fuel cut-off valves; 5, four-way valve for switching over between supply of fuel air and suction of combustion waste gas; 6, combustion waste gas exhaust port; and 7, an object of treatment such as a steal plate.

When one of the burners 2a is in combustion, the temperature of combustion air fed to the regenerator 3a, for example, 30° C., and this air is heated by the regenerator 3a into preheated air at 1,250° C., which is fed to the burner 3a. Preheated air is burnt together with a combustion gas and fed to the heating furnace main body 1. A part of the combustion waste gas is sucked into the regenerator 3b at 1,350° C. via the burner 2b, heats the regenerator 3b, and is discharged as combustion waste gas at 200° C. The balance of combustion gas is discharged from the exhaust port 6 to outside the furnace. Switching between the burners 2a and 2b is conducted in linkage with switching between the fuel cut-off valves 4a and 4b and the combustion air and combustion waste gas switching four-way valve 5. The switching period (alternating period) of the burners 2a and 2b should preferably be a high frequency of the order from about 10 to 30 seconds, but this is not limitative.

In a heating furnace of this type, the heat recovery efficiency is improved by incorporating a waste heat recovery system based on repetition of heat accumulation and heat dissipation in a short period of time and providing regenerators 3a and 3b.

The regenerators 3a and 3b should preferably be structures which have a large heat exchanging area per unit volume, a large gas passage area, and a small pressure loss upon passage of a fluid. For example, a honey-comb structure is suitable. For this reason, a honey-comb type regenerator is used for the direct-fired burner. A ceramic material not melting at a high temperature is used as a material for the honey-comb type regenerator because a combustion gas at a high temperature of over 1,300° C. passes therethrough. Such a ceramic honey-comb is manufactured by sintering an extrusion-formed material. Therefore, the sectional shape of honey-comb in a regenerator made of a ceramic honey-comb is constant in the flow direction.

In the heating furnace shown in FIGS. 2 to 4, the above-mentioned burners are arranged in two stages including upper and lower ones with an object path in between: A1 to A19 are upper burners and B1 to B19 are lower burners. The area covering A1 to A3 and B1 to B3 is the first preheating zone; the area covering A4 to A8 and B4 to B8 is the second preheating zone; the area covering A9 to A13 and B9 to B13 is the heating zone; and the area covering A14 to A19 and B14 to B19 is the soaking zone. The flue shown in FIG. 3 serves as the aforementioned combustion waste gas exhaust port 6, and can be opened or closed by a dumper. A typical example of the heating furnace is a heating equipment for steel, and particularly, an equipment using the by-product gas from a blast furnace as fuel is suitable.

The principle of the present invention will now be described.

In the invention, contrivances are made in the form of the porous regenerators contained in the direct-fired burners or the regenerative combustors or the regenerative heat exchanger arranged in areas where materials causing choking tend to deposit so that such materials becomes hard to deposit or choking phenomenon does not become apparent even upon deposit. It is thus possible to prevent or inhibit occurrence of various problems caused by choking.

When applying a heat treatment to an object of treatment in a heat treatment equipment having a plurality of direct-fired burners having built-in porous regenerators, regenerative combustors or regenerative heat exchangers, or when performing heat exchange by passing a gas through a heat exchange chamber in a heat treatment equipment having a plurality of regenerative heat exchangers, choking phenomenon does not make a progress uniformly for all the porous regenerators. The present invention was developed on the basis of such findings. More specifically, it is avoided that the porous regenerators built in the direct-fired burners, the regenerative combustors or the regenerative heat exchangers are uniform in terms of the substantial average surface pore diameter so as to decelerate the progress of choking phenomenon as a whole for the porous regenerators arranged in areas where choking tends to occur relatively easily.

For example, progress of choking is more rapid in the porous regenerators in the direct-fired burners or the regenerative heat exchangers arranged in an area near the path port through which exogenous off-purpose substances come in (referred to as the "first area" in the fourth, seventh and ninth aspects of the invention; and referred to as "the first area" and "the second area" in the fifth aspect of the invention) than in those arranged in the other area (referred to as the "second area" in the fourth, seventh and ninth aspects of the invention; and referred to as the "third area" in the fifth aspect of the invention). This may perhaps be attributable to the fact that exogenous off-purpose substances promote choking most actively, followed by endogenous off-purpose substances, and/or endogenous off-purpose substances tend to easily occur near the path port where there is a large temperature difference between outside and the interior of the heat treatment equipment.

In the heating chamber attached with direct-fired burners or regenerative heat exchangers, the progress of choking in the porous regenerators contained in the direct-fired burners or the regenerative heat exchangers is more rapid in the area closer to the entry section through which the object of treatment is carried in from outside (referred to as the "first area" in the fifth aspect of the invention) than in the area closer to the exit section through which the object is carried out (referred to as the "second area" in the fifth aspect of the invention). This may perhaps be attributable to the fact that, because the gas in the heating chamber flows from the entry section toward the exit section, exogenous off-purpose substances tend to come more easily in through the entry section than through the exit section. When an area not belonging to any of these two areas (corresponding to the "third area" in the fifth aspect of the invention) can be set, progress of choking would be more rapid in these two areas than the remaining area. Whether or not the "remaining area" can be set depends upon the shape of the heating chamber (particularly, the length forming the path, a structure causing a change in the flow rate of the gas in the chamber, or the presence of a structure causing a sudden temperature difference), or whether or not there is a path port other than the exit section and the entry section, and eventually various with the kind, features and other conditions of the heat treatment equipment.

When a gas flows in from outside toward the heating chamber of the heat treatment equipment, choking of the porous regenerators built in the direct-fired burners, or the regenerative combustors, or the regenerative heat exchangers arranged along the gas flow more easily occurs in the upstream than in the downstream. This is considered to be due to the fact that the density of exogenous substances is higher in the upstream. Such a difference in the degree of progress of choking between upstream and downstream of the gas flow has no relationship with the presence of the heating chamber, although there may be a difference in extent, and can occur even in the plurality of regenerative heat exchangers attached in the heat exchange chamber.

When the gas flows out from the heating chamber of the heat treatment equipment to outside, choking of the pore regenerators of the direct-fired burners or the regenerative heat exchangers arranged along the gas flow can tend to occur more easily in those arranged in the upstream. This is considered attributable to the fact that the density of endogenous off-purpose substances, in addition to that of exogenous off-purpose substances is higher in the upstream, i.e., on the heating chamber side.

Another conceivable cause is the temperature difference. In the areas near the entry section and near the exit section, the temperature difference is large with outside. In the entry section, a lower-temperature open air comes in the heat treatment equipment rather than discharge of the high-temperature gas in the interior to outside. In the exit section, in contrast, the high-temperature gas is discharged outside rather than inflow of the open air. The temperature difference causing occurrence of endogenous off-purpose substances is therefore large in the entry section. As a result, progress of choking is considered to be more rapid in the area closer to the entry section.

Even within a heat treatment equipment, a difference may sometimes be caused in the speed of progress of choking in the porous regenerators. As described later, progress of choking is relatively more rapid in the porous regenerators of direct-fired burners or regenerative heat exchangers arranged at a position where the temperature profile in the heat treatment equipment, particularly in the heating chamber and a relatively large temperature difference is caused (for example, in a continuous heat treatment equipment of steel sections, a boundary position between a preheating zone and a heating zone, or a boundary position between a heating zone and a soaking zone) or in an area in the proximity thereof, than in those arranged otherwise. This is considered to be due to the fact that, even within the heat treatment equipment, a large temperature difference causes occurrence of endogenous off-purpose substances. In summary, a large temperature difference is observed, not only in the entry section and the exit section, but also in the heating chamber, or even in the heat treatment equipment.

Another conceivable cause of choking phenomenon in porous regenerator is gravity. Since a gas flow is formed in the heating chamber, fine particles or lightweight target substances are blown off under the effect of gas pressure and estimated to scatter in diverse and various directions. However, because gravity acts more or less on exogenous or endogenous off-purpose substances, these substances tend to move from up to down basically under the effect of action of gravity irrespective of the presence of the heating chamber. Therefore, a porous regenerator arranged at a lower position is more susceptible to choking. For example, in the heating furnace shown in FIGS. 2 to 4, at the same horizontal position, choking is more easily caused in the lower burner than in the upper burner.

In a heat treatment equipment of a kind (for example, waste incinerating facilities), contribution to choking phenomenon in porous regenerators of regenerative burners or regenerative heat exchangers is larger for endogenous off-purpose substances than for exogenous off-purpose substances. This is considered attributable to the fact that, since off-purpose substances produced in the heating chamber of the incinerator having a temperature far higher than that outside is huge in quantity and in the form of fine particles, it is difficult to completely remove such substances. Therefore, endogenous off-purpose substances serving to cause choking are larger in quantity than exogenous off-purpose substances. Even in such a case, porous regenerator arranged on the higher-temperature side or in the upstream in the gas flow direction is more easily susceptible to choking phenomenon. Such a heat treatment equipment is the heat treatment equipment intended by the present invention.

By-products which are materials causing choking other than exogenous and endogenous off-purpose substances basically cause choking in porous regenerators in which choking is caused by exogenous and endogenous off-purpose substances. They therefore promote progress of choking phenomenon, together with the exogenous and/or endogenous off-purpose substances, in an area near the path port, an area in the upstream of the gas flow, an area where a large temperature difference occurs, an area where the gas flow temperature is higher, an area where a large temperature difference occurs, and an area closer to the exit section than the entry section.

Thus, by ensuring that the substantial average surface pore diameter is not uniform for all the porous regenerators, it is possible to make it difficult for choking phenomenon to occur than in usual cases.

In summary, as derived from the principle of the present invention, areas in which choking tend to easily occur can be specified as follows: (1) an area where there is a path port opening or capable of opening toward outside, and an area where a steep temperature gradient is impressed; (2) when off-purpose substances are carried by the gas flow, an area located more in the upstream of the gas flow, or an area where a gas of a higher temperature flows; and (3) an area located at a lower position in the vertical direction where off-purpose substances can easily move in accordance with the natural law. From the point of view of the gas flow direction, for (1) and (2) above, the areas in the uppermost stream and the lowermost stream of the gas flow are areas opening or capable of opening toward outside where temperature is higher than outside and the temperature gradient tends to change suddenly. The definitions therefore tend to overlap in some cases. For (2) above, when recovering heat from the incinerating equipment by use of regenerative heat exchangers, or when using regenerative burners as a heat source, the quantity thereof becomes larger than that of the endogenous off-purpose substances produced in the heating chamber of the incinerator, leading to a relatively larger contribution to choking phenomenon. In this case, choking may tend to more easily occur on the higher gas flow temperature side irrespective of whether or not it occurs in the upstream of the gas flow. Therefore, in (2) above, an area more in the upstream along the gas flow direction may sometimes agree with the higher temperature side. Furthermore, the path port of (1) can be divided into an entry section, an exit section, and other path port, and choking tend to easily occur in the entry section and an area closer thereto, the exit section and an area closer thereto, and path port other than the above and an area closer thereto in this order.

When the regenerative combustor comprises a pair of direct-fired burners performing alternate combustion, or in a regenerative heat exchanger in which the gas performs heat exchange through a pair of porous regenerators while alternately changing the flowing direction, or in a pair of regenerative combustors performing alternate combustion, there would be present at least two porous regenerators in a regenerative combustor, a regenerative heat exchanger, or a pair of regenerative combustor. Even a case where the substantial average surface pore diameter is not uniform between these at least two (particularly only two) porous regenerators is included within the scope of the present invention and is not excluded therefrom.

In FIGS. 25(a) and 25(b), a pair C1 and C1, a pair C2 and C2, a pair D1 and D1 and a pair D2 and D2 are, respectively, a pair of direct-fired burners performing alternate combustion, a pair of heat exchangers through which the gas flows alternately, and a pair of regenerative combustors performing alternate combustion. In FIGS. 25(a) and 25(b), the X-direction is on the path port side, the upstream side of the flowing gas, or the high-temperature side, and the Y-direction shows the side of area more distance from the path port side, the downstream side of the flowing gas or the low-temperature side. In FIG. 25(a), the pair C1 and C1 and the pair C2 and C2 are arranged on the same side (any of the right side and the left side). In FIG. 25(b), in contrast, the pair C1 and C1 and the pair C2 and C2 are arranged on sides opposite to each other (the right side and the left side). In FIG. 25(c), the pair D1 and D1 and the pair D2 and D2 are arranged on the same side (any of the right side or the left side), but divided into upper and lower chambers. In FIG. 25(d), the pair D1 and D1 and the pair D2 and D2 are arranged on sides opposite to each other (the right side and the left side), divided into upper and lower chambers.

According to the invention, setting is made so that the substantial average surface pore diameter is different between the porous regenerators on the X side C1 and C2 and C1 and C2 on the Y side. Particularly, the substantial average surface pore diameter for the former is set to be larger than that of the latter. According to the invention, setting is made so that the substantial average surface pore diameter is different between the porous regenerators of D1 and D2 attached to the lower chamber and those of D1 and D2 attached to the upper chamber in FIGS. 25(c) and 25(d). Particularly, the substantial average surface pore diameter for the former should be larger than those for the latter.

In FIG. 26, a pair E1 (right side of the upper chamber) and E1 (left side of the lower chamber), a pair E2 (right side of the lower chamber) and E2 (left side of the upper chamber), a pair F1 (left side of the upper chamber) and F1 (right side of the lower chamber), and a pair F2 (left side of the lower chamber) and F2 (right side of the upper chamber) attached to the upper chamber and the lower chamber in XY directions are a pair of direct-fired burners performing alternate combustion, a pair of heat exchangers through which the gas flows alternately in different directions, or a pair of regenerative combustors performing alternate combustion, provided in the heating chamber or in a space other than the heating chamber (for example, heat exchange chamber). When assuming a schematic configuration in which porous regenerators are arranged as shown in FIG. 26, and there are present four pairs of porous regenerators, according to the invention, setting is made so that the substantial average surface pore diameter is different between the X-side porous regenerators and the Y-side ones for each of the upper chamber and the lower chamber. Particularly, the substantial average surface diameter for the former is larger than that for the latter. The substantial average surface pore diameter is different also between the porous regenerators attached to the lower chamber and those attached to the upper chamber. Particularly, the substantial average surface pore diameter is larger for the former than that for the latter. As a result, the substantial average surface pore diameter of the porous regenerators of E2 and F2 shown in FIG. 26(c) (sectional view of FIG. 26(a) cut along the line S—S) would be set to a largest value, and the substantial average surface pore diameter of the porous regenerators of E2 and F2 shown in FIG. 26(d) (sectional view of FIG. 26(b) cut along the line T—T) would be set at a smallest value.

It is possible to more minutely divide areas where choking easily occurs by appropriately combining three areas (1) to (3). However, the invention does not exclude areas based on such combination from the technical scope thereof, as described below. Broadly, although there are differences in category of invention, the first to ninth aspects of the invention correspond to (1) above in a heat treatment equipment having a heating chamber; the third, seventh and ninth aspects of the invention described (1) above more specifically; and the fourth and fifth aspects of the invention describe them further in detail. The tenth to thirteenth aspects of the invention corresponds to (2) above, in a heat treatment equipment having a heating chamber and a space other than the heating chamber (for example, a heat exchange chamber), and the twelfth aspect of the invention corresponds to a specific description thereof in detail. The fourteenth aspect of the invention corresponds to (3) above in a heat treatment equipment having a heating chamber, and the fifteenth aspect of the invention corresponds to (3) above, irrespective of the presence of a heating chamber, a heat exchange chamber or the like.

According to the invention, therefore, in areas tending to easily have choking, it is possible to prevent or inhibit occurrence of choking in porous regenerators built in regenerative burners, regenerative combustors or regenerative heat exchangers. More specifically, according to the first to fifth aspects of the invention (corresponding to claims 1 to 5, respectively), in areas tending to easily have choking in the heating chamber, it is possible to achieve a heat treatment equipment having direct-fired burners or regenerative combustors which make it difficult for choking phenomenon to occur. According to the sixth and seventh aspects (corresponding to claims 6 and 7), in areas tending to easily have choking in the heating chamber of the heat treatment equipment, it is possible to achieve a method of installing porous regenerators built in direct-fired burners or regenerative combustors so as to make it difficult for choking to occur. According to the eighth and ninth aspects of the invention (corresponding to claims 8 and 9), in areas tending to easily have choking in the heating chamber, it is possible to achieve a manufacturing method of an object heat-treated by use of a heat treatment equipment having direct-fired burners or regenerative combustors so as to make it difficult for choking to occur.

According to the tenth and eleventh aspects of the invention (corresponding to claims 10 and 11, respectively), in areas tending to easily have choking in the heating chamber, or a space other than the heating chamber where a gas flow is formed (particularly, an area in the upstream of the gas flow in the eleventh aspect), it is possible to achieve a heat treatment equipment having regenerative heat exchangers so as to make it difficult for choking to occur. According to the twelfth aspect of the invention (corresponding to claim 12), in areas tending to easily have choking in the heating chamber or a space other than the heating chamber where a gas flow is formed, it is possible to achieve a method of installing porous regenerators built in regenerative heat exchangers so as to make it difficult for choking to occur. According to the thirteenth aspect of the invention (corresponding to claim 13), in areas tending to easily have choking in the heating chamber heat exchange chamber or other space where a gas flow is formed (particularly, an area in the upstream of the gas flow in the eleventh aspect), it is possible to achieve a method of manufacturing an object heat-treated by use of a heat treatment equipment having regenerative heat exchangers so as to make it difficult for choking to occur.

According to the fourteenth and fifteenth aspects of the invention (corresponding to claims 14 and 15), it is possible to achieve a heat treatment equipment having regenerative heat exchangers which make it difficult for choking to occur in a vertically lower area where choking tends to easily occur (particularly, an area in the heating chamber in the fourteenth aspect).

According to the sixteenth aspect of the invention (corresponding to claim 16), it is possible to achieve a method of selecting a porous regenerator which makes it difficult for choking to occur in an area tending to easily have choking.

According to the seventeenth to nineteenth aspects of the invention (corresponding to claims 17 to 19, respectively), it is possible to achieve constituent members of a porous regenerator selected and used so as to make it difficult for choking to occur in an area tending to easily have choking.

According to the present invention, as described above, it is possible to prevent occurrence or inhibit progress of choking phenomenon in a porous regenerator in an area tending to have choking relatively easily. It is therefore possible to decelerate progress or appearance of choking in the porous regenerator for a heat treatment equipment or operation thereof as a whole. Furthermore, through extension of the service life of the porous regenerator or the replacement period thereof, it is possible to maintain a high combustion efficiency of a regenerative burner or a regenerative combustor or a high heat exchange efficiency of a regenerative heat exchanger, and hence a high operating efficiency of a heat treatment equipment having the same, thus permitting reduction of the equipment and management cost relating to maintenance of the heat treatment equipment. Particularly, the seventeenth to nineteenth aspects of the invention provides a remarkable cost reducing effect.

The present invention will now be described further in detail by means of embodiments.

FIGS. 2 and 3 illustrate a schematic longitudinal sectional view and a schematic cross-sectional view of a heating furnace, a type of the heat treatment equipment of the invention, respectively.

In FIG. 2, areas of the heating chamber near the carry-in door and the carry-out door of an object correspond to the entry section and the exit section, respectively. The carry-in door and the carry-out door are opened only when the object is carried in from outside toward the entry section and when the object is carried out from the exit section to outside, and are closed for all the other cases.

The heating chamber serves as the nucleus of the heating furnace, and can be divided into an upper furnace comprising upper burners A1 to A19 and a lower furnace comprising lower burners B1 to B19. As is known from FIGS. 2 and 3, the upper furnace and the lower furnace each comprises 19 pairs of upper and lower burners. The four zones including a first preheating zone, a second preheating zone, a heating zone and a soaking zone shown in FIGS. 2 and 3 are achieved on the basis of differences in heat treating conditions, particularly heat input conditions for each of the upper furnace and the lower furnace shown in the drawings as examples. When the four zones are considered as cells, respectively, the heating chamber in the heating furnace can be considered as comprising four cells, or as four heating chambers connected.

FIGS. 2 to 4 illustrate a case where the direction of flame of the direct-fired burner (burner axis) is perpendicular to the object moving direction, but this is not intended to exclude a case where the burner axis is in parallel with the object moving direction (for example, Japanese Unexamined Patent Application Publications Nos. 8-210780 and 7-97619). The present invention covers a case where the burner axis is not perpendicular to the object moving direction.

First, the substantial average surface pore diameter will be described. While details will be explained below, the substantial average surface pore diameter in the present invention is an evaluation index defined for objectively determining the choking phenomenon as far as possible. More specifically, without the intention to limit the invention, the substantial average surface pore diameter is the size of pores (including false pores) of a regenerator defined in the surface layer ranging from the surface of a porous regenerator to a certain depth. In the present invention, however, as described later, parameters having a correlation with the progress of choking phenomenon, such as changes in pressure or pressure loss of the gas passing through the porous regenerators of the burners, which are irrelevant at first sight to the size of pores of the regenerators, are not excluded from the definition of the substantial average surface pore diameter.

Choking phenomenon of porous regenerator, of which various generation processes are conceivable, may primarily be considered a choking caused by deposition of off-purpose substances onto interior of pores. This choking, if observed for a long period of time, may be considered as a phenomenon over the entire interior surface of a pore in a regenerator. An actual choking phenomenon, however, occurs in the surface layer from the surface of the porous regenerator up to a certain depth. Choking of the surface layer therefore becomes so serious that the porous regenerator is not usable when choking progresses over the entire internal surface of the pore. Whether or not choking has progressed so as to make it impossible to use may be determined within a range of from several cm to 10 cm from the regenerator surface. For the purpose of knowing only presence of occurrence of choking, it suffices to set a thin surface layer of about a few cm or 3 to 4 cm. When evaluating the service life of the regenerator for a long period of time, it suffices to set a thick surface layer of even 10 cm, and examine the extent of choking occurring there. Depending upon conditions, this does not exclude the possibility of necessity to set a thick surface layer of even several tens of cm. For example, when scale scatter is a main substance causing choking, choking occurs on the high-temperature side of the upper portion of the regenerator. It therefore suffices to set a substantial average surface pore diameter within a range of a few centimeters (for example, 2 to 3 cm) from the surface layer. If the by-product generated from a reaction between the regenerator and an off-purpose substance, it should be set within a range of about 10 cm from the surface layer. When dew-fall of the off-purpose substances having been gasified in the low-temperature portion of the regenerator (hence the lower portion of the regenerator) cannot be disregarded, it is necessary to set a thick surface layer including this low-temperature portion. The substantial average surface pore diameter should be set within, for example, a range of from several cm to 10 cm.

When a porous regenerator is composed of a plurality of constituent members piled one on top of the other (including a case where constituent member material is intentionally changed along the gas flowing direction in the regenerator), the substantial average surface pore diameter may be determined by sampling several constituent members present within the surface layer thickness range set as above. For example, the substantial average surface pore diameter is determined by sampling honey-comb constituent members from a first stage (2.5 cm) or first and second stages (5 cm) on the top side (high-temperature side) of a honey-comb regenerator comprising 2.5 cm-high honey-comb constituent members piled into multiple stages.

In summary, the substantial average surface pore diameter is defined by setting thickness for individual surface layers taking account of the extent and details of choking, kinds of substances in question causing choking, staging state of regenerator constituent members and the like.

The state in which choking has progressed to such an extent as not permitting use is not a state in which pores are completely choked by deposition of off-purpose substances, but a state of choking of pores to such an extent that a certain past level has been reached. Progress of pore choking causes an increase in the pressure of gas passing through the regenerator, and poses problems in heat treatment equipment stability and safe operation. However, frequent inspection and replacement of the regenerators to solve choking of pores lead to an increase in equipment management cost. The "certain level" for comparison with the pore choking state is set as a critical value empirically selected as a harmony point of these mutually contrary demands. In summary, the substantial average surface pore diameter is a parameter correlated with the state of choking of pores set for the surface layer ranging from the regenerator surface to a certain depth, and is set for the purpose of quantifying the choking phenomenon. When the "certain level" of parameter is reached, this means that the regenerator suffering from choking is in a state not permitting further use of the regenerator which is at an end of the service life, and it is necessary to replace the regenerator through maintenance operation.

Any parameter may be adopted as a substantial average surface pore diameter so far as it is for quantifying a choking phenomenon occurring in the surface layer of the regenerator. The simplest index of quantitatively evaluating the choking phenomenon is the choking rate ($\rho$) of pore. This can be defined as a ratio of a change in sectional area of the initial pore to the pore suffering from choking. FIG. 6 shows, from among regenerator constituent members (FIG. 6(b)) forming a part of a gas passage end face of a honey-comb type regenerator (FIG. 6(a)), when adopting an arbitrary unit cell Cm, the sectional area Sc of pores forming such a unit cell Cm (FIG. 6(c)). In FIG. 6, the unit cell section is drawn as a square. When considering the choking rate, however, the section of the unit cell is not limited to a square, but may be a substantial semi-circular, rectangular, circular or any other shape.

In the case of a honey-comb type regenerator, in which straight pores are present in almost a uniform shape along the flow of gas passing through the regenerator, a unit cell or pores forming a unit cell may be primarily determined. In such a case, the choking rate ($\rho$) can be relatively simply defined as:

$\rho(\%) = [(Sc(o) - Sc(t)/Sc(o)] \times 100$ where, Sc(o) means an initial Sc in which choking does not as yet occur; and Sc(T) means Sc in a stage where choking has progressed after the lapse of time t.

In the case of, for example, a ball type regenerator, on the other hand, in which pores, i.e., false pores, not comprising straight pores, are formed by connecting gaps between balls in a lump comprising many balls, it is not so easy as in the case shown in FIG. 6 to define a unit cell or the sectional area, i.e., the choking rate, of pores forming a unit cell. If a ball type regenerator is a collection of spherical members of the same size, it could relatively define it easily in a geometrical manner. However, definition is difficult when a regenerator is a collection of constituent members of different shapes.

The following expedient can be taken. Four constituent members (B1, B2, B3 and B4) the closest to each other are regarded as a unit cell Qm. A rectangle is formed by connecting center positions (which may be approximate center positions) (a, b, c and d) of the constituent members with straight lines. The remaining area obtained by subtracting duplications with areas formed by projecting the constituent members onto a plane from the rectangle is used as a sectional area Sq of the unit cell Qm. The choking rate $\rho$ of the pores (false pores) can be defined by means of this Sq as follows:

$\rho (\%) = [(Sq(o) - Sq(t)/Sq(o)] \times 100$ where, Sq(o) means the initial Sc in which choking does not as yet occur, and Sq(t) means Sq in a stage where choking has progressed after the lapse of time t.

By setting B1 and B4 as representatives in a desired surface layer, representativity of Sq is improved. If this is difficult, a plurality of unit Qm are set, and an average value is adopted as Sq, which serves to calculate the choking rate. For evaluation of choking phenomenon, it is possible to more accurately define the sectional area of false pores. The above-mentioned setting method of Sq is only an example, and is not intended to exclude a more accurate definition of the sectional area of false pores.

Figure 7:
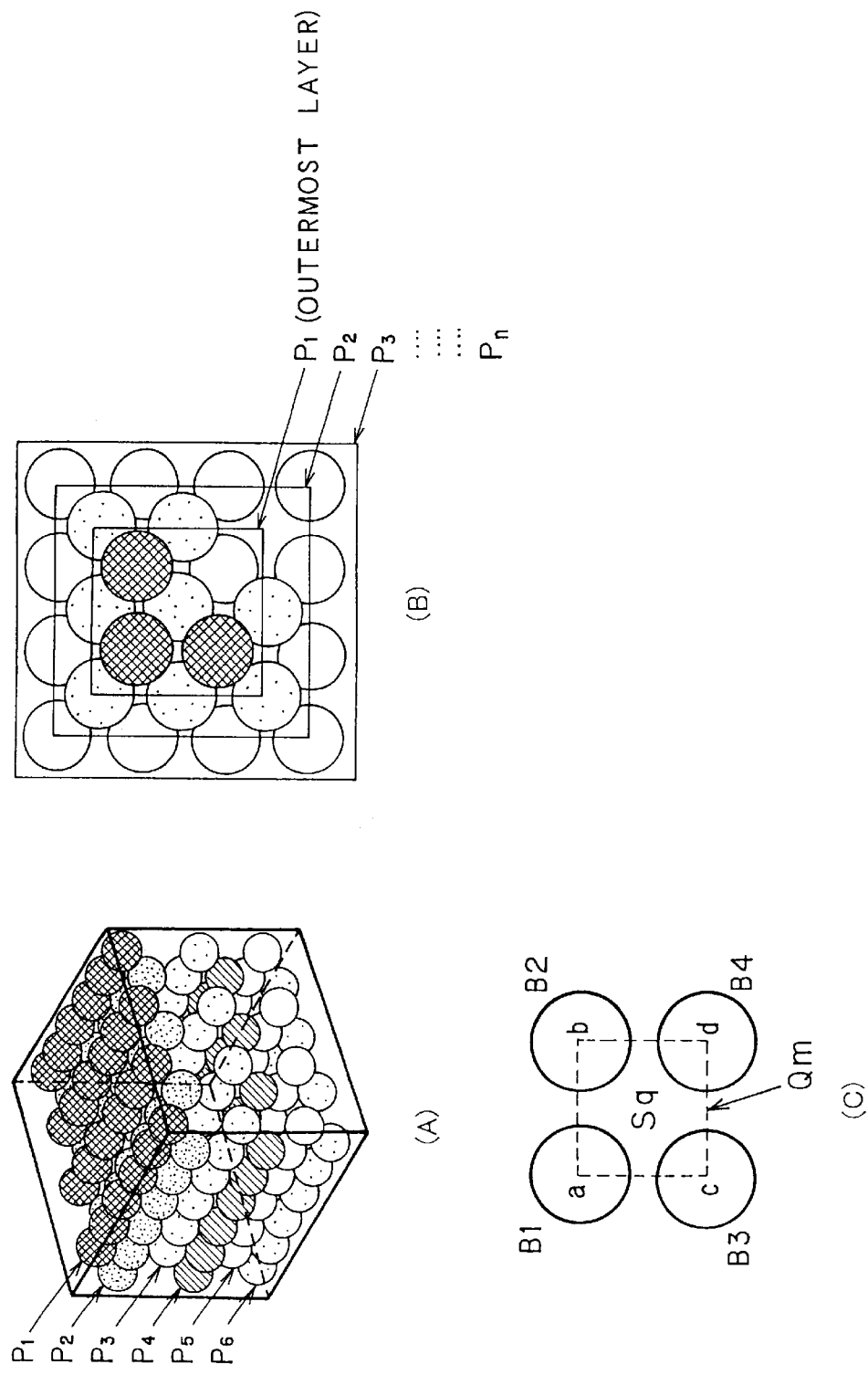
FIG. 7 is a descriptive view of a unit cell of a ball type regenerator; (a) is a perspective view of the regenerator; (b) is a perspective view of the component members of the regenerator; and (c) is a descriptive view of a sectional area of a pore of the unit cell.

FIG. 7 illustrates a ball type regenerator permitting relatively easy setting of Qm and Sq. In this example, the surface layer comprises six layers P1 to P6 (FIG. 7(a)). Constituent members are regularly arranged on each layer. The individual layers are laminated with regular spatial phase shifts (FIG. 7(b)). As a result, the unit cell Qm forms ideally a square (a, b, c and d), and Sq is obtained by subtracting sectional area cut along the equatorial line of the balls which are constituent members (FIG. 7(c)).

Figure 8:
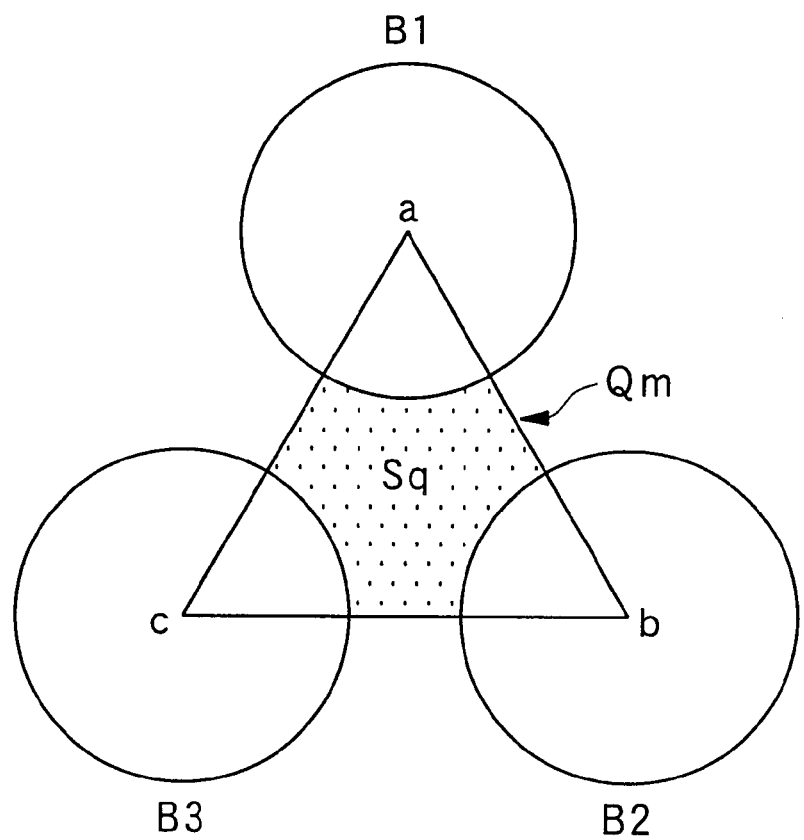
FIG. 8 is a descriptive view of a unit cell of another ball type regenerator.

An expedient method for defining the choking rate of a ball type regenerator is as follows, while the above-mentioned method comprises the steps of "regarding four constituent members as a unit cell Qm; forming a rectangle by connecting center positions of the constituent members with straight lines; and using the remaining area obtained by subtracting duplications with areas formed by projecting the constituent members onto the same plane as that of the rectangle from the rectangle as a sectional area Sq of the unit cell Qm."; when members forming the regenerator have a high density, three closest constituent members would be arranged so that the center positions of the constituent members become apex positions of the triangle while being in contact with each other. When the three constituent members can be deemed to form a unit cell Qm, including the above case, it would be recommendable to "regard the three closest constituent members as a unit cell Qm; forming a triangle by connecting the center positions of the constituent members with straight lines; and using the remaining area obtained by subtracting duplications with areas formed by projecting the constituent members onto the same plane as that of the triangle from the triangle as a sectional area Sq of the unit cell Qm" (see FIG. 8). This is another example of the method for defining the choking rate.

Figure 9:
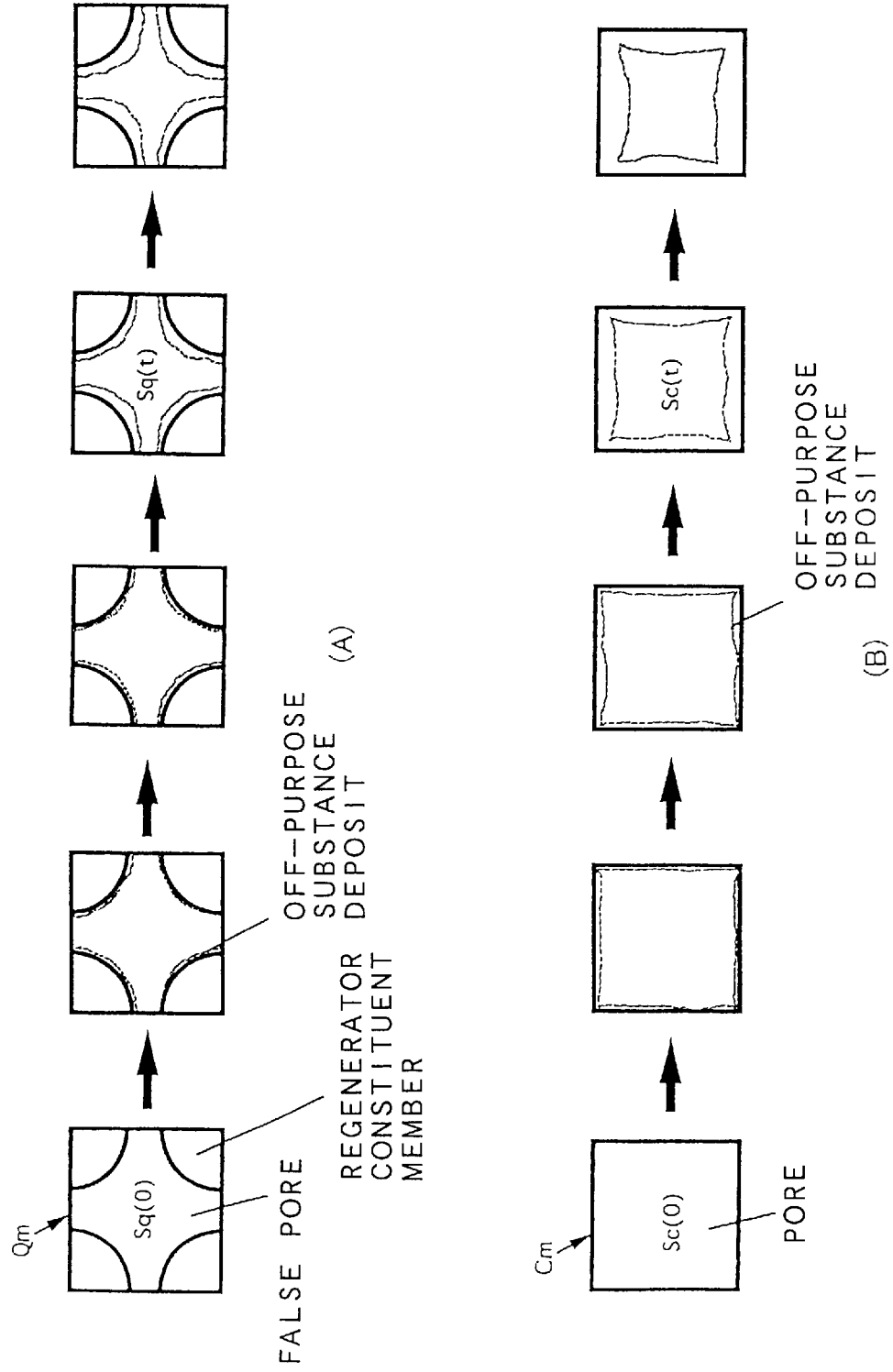
FIG. 9 is a descriptive view illustrating progress of the choking phenomenon:
(a) is a descriptive view of progress of choking phenomenon in a unit cell (Qm); (b) is a descriptive view of progress of choking phenomenon in a unit cell (Cm).

FIG. 9 is a schematic view of the progress of choking in a unit cell. FIG. 9(a) relates to the unit cell Qm, and FIG. 9(b) relates to a unit cell Cm. In all cases, it is shown that the amount of deposited off-purpose substances increases with the lapse of time t, and finally, a choking rate not permitting further use (critical choking rate) is reached. This final stage is a timing for replacement of the porous regenerators in the heat treatment equipment, which means the expiration of the service life (critical life) of the porous regenerator.

The value of sectional area of pores of a unit cell (Sc(t), Sq(t): t$\geq$0) set in relation to pores and false pores in terms of choking phenomenon can be defined as the substantial average surface pore diameter of porous regenerator.

The substantial average surface pore diameter has been defined above from the point of view of the size of pores (or the degree of progress of choking of pores, or the choking rate ($\rho$). It is easily understandable that a change in the pore size (hence the choking rate) has a correlation with a change in pressure or pressure loss of the gas passing through the regenerator. It is therefore possible to convert a choking rate into a change in pressure or in pressure loss by quantitatively determining the relationship between a change in gas pressure or gas pressure loss and the choking rate. By setting a critical gas pressure value or a critical gas pressure loss value dependent upon the critical choking rate, it is possible to know the critical service life or timing of replacement of the porous regenerator from a change in gas pressure or gas pressure loss. By quantitatively determining the relationship between the gas pressure or the gas pressure loss and the substantial average surface pore diameter, it is possible to convert a substantial average surface pore diameter into a gas pressure or a gas pressure loss, and it is possible to calculate the choking rate which is a change in the substantial average surface pore diameter from a change in gas pressure or gas pressure loss, and know the critical service life or the timing of replacement on the basis of whether or not the critical choking rate has been reached. This means that, in all the aspects of the invention, "not uniform substantial average surface pore diameter" and "not uniform parameters such as gas pressure or gas pressure loss having a correlation with choking" are only different expressions of a substantially identical technical matter mutually convertible and easily convertible. The present invention contains a technical idea of using another parameter which is equivalent using such a substantial average surface pore diameter, even if it is not used actually.

What is particularly important as to a feature of the invention not limiting the parameter to the "pore size" is a case where ball type regenerators and honey-comb type regenerators are present simultaneously. It is usually difficult, if not impossible, to compare changes in choking rate on the basis of the substantial average surface pore diameters Sc(t) and Sq(t) of these two kinds of regenerator. Comparison of false pores formed by collection of commercially available ball type regenerator constituent members and pores in a honey-comb type regenerator (constituent members thereof) suggests that, while approximation is included when defining the former, approximation is not basically necessary when defining the latter, from the point of view of size and shape. A useful method for comparing these pores having different natures is to pay attention to the pressure or pressure loss of the gas flowing through the regenerator or changes therein. For example, it would be rational to evaluate choking to pay attention to the parameter of pressure loss, not a parameter of the substantial average surface pore diameter, and compare pores and false pores both having a pressure loss on the same level.

Examination of size and shape of commercially available constituent members of a ball type regenerator and a honey-comb type regenerator, and observation of a gas pressure loss occurring in these kinds of regenerator or changes therein reveal that choking is qualitatively harder to occur in false pores in the ball type regenerator than in pores in the honey-comb regenerator (or constituent member thereof). This means, if this tendency is projected onto the concept of substantial average surface pore diameter, that: (1) the substantial average surface pore diameter is not uniform between the ball type regenerator and the honey-comb regenerator; and (2) the substantial average surface pore diameter is larger for the former than for the latter. Therefore, all the aspects of the invention are valid even when ball type regenerators and honey-comb type regenerators are installed in the same heat treatment equipment or attached to the heating chamber of a heat treatment equipment. For example, the fourth aspect of the invention covers an embodiment in which ball type regenerators are arranged in the first area closer to the path port and honey-comb type regenerators, in the other areas. The fifth aspect of the invention covers an embodiment in which ball type regenerators are arranged in the entry section or the first area near the entry section, and honey-comb type regenerators, in the other second and third areas. The tenth aspect of the invention covers an embodiment in which ball type regenerators are arranged in the upstream of the gas flow, and honey-comb regenerators, in the downstream. The fifteenth aspect of the invention covers an embodiment in which honey-comb type regenerators are arranged in the upper portion in the vertical direction, and ball type regenerators, in the lower portion thereof.

Figure 10:
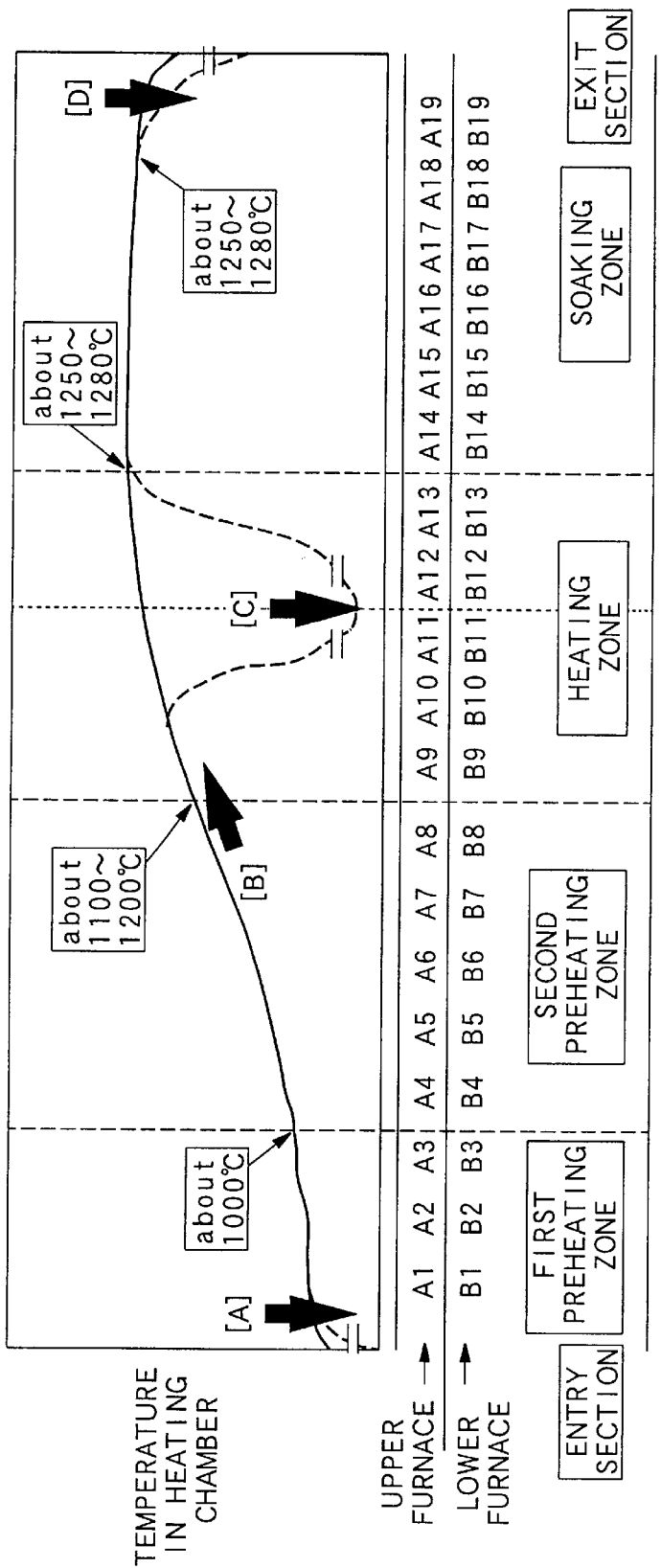
FIG. 10 illustrates a temperature profile and charges thereof in a heating chamber of a heating furnace.

FIG. 10 illustrates a temperature profile achieved in the heating chamber under the heat input conditions shown in FIGS. 2 and 3 as examples. The object moving in the heating furnace is subjected to a heat treatment corresponding to this temperature profile and to a sudden heating as shown by [B] over the range from the latter half of the second preheating zone to the heating zone. As a result, choking is caused of the porous regenerators due to endogenous off-purpose substances typically represented by by-products.

Upon opening the carry-in door, temperature of the entry section suddenly decreases as shown by [A]. Upon opening the carry-out door, temperature of the exit section suddenly decreases as shown by [D]. By opening the flue dumper provided in the heating zone area, temperature of the heating zone area suddenly decreases as shown by [C]. The extent of temperature drop at [A], [D] and [C] depends upon the time of opening of the doors or the dumper, and opening thereof causes ingression of exogenous off-purpose substances into the heating chamber or generation of endogenous substances resulting from temperature drop, thus causing choking.

Figure 11:
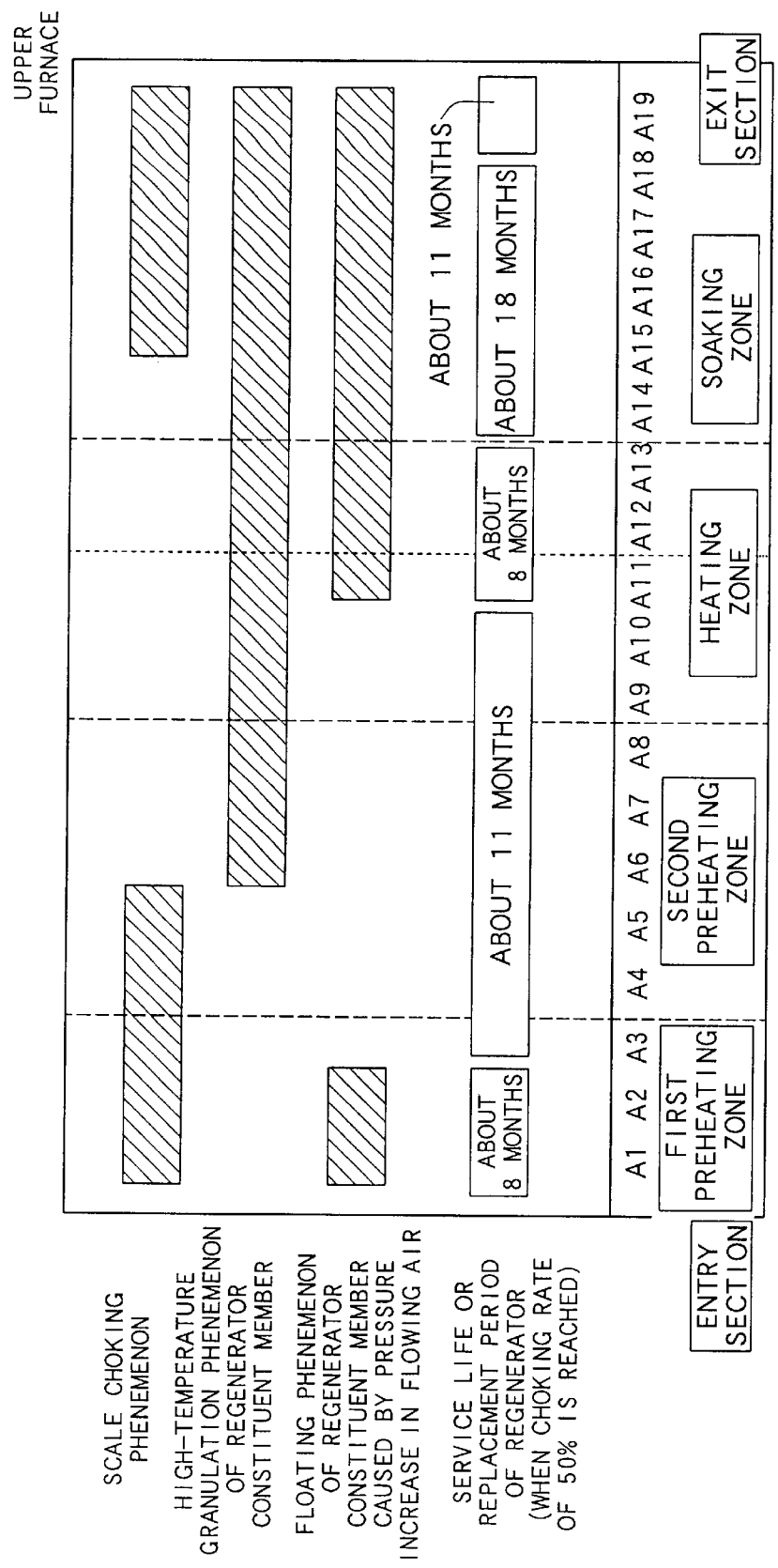
FIG. 11 is a descriptive view of choking phenomenon is the upper furnace.

FIG. 11 illustrates choking problem in porous regenerator produced in the upper furnace by actual operation of the heating furnace. For information, FIG. 11 shows the result of operation of the heating furnace with only the flue dumper in the heating zone area opened or closed as required, and the other flue dumpers kept closed. The heat treatment in the heating chamber was carried out through alternate combustion of a regenerative combustor comprising a pair of direct-fired burners as shown in FIG. 1. Honey-comb type regenerators were charged in these direct-fired burners.

Scale choking phenomenon illustrated by FIG. 11 is a choking phenomenon caused by scale. High-temperature granulation phenomenon of a regenerator constituent member means choking phenomenon caused by powder produced by gradual granulation of the regenerator constituent member exposed to high temperatures over 1,300° C. through alternate combustion operation of the regenerative combustor composed of a pair of direct-fired burners as shown in FIG. 1. This high-temperature granulation largely depends upon operating conditions of the heat treatment equipment and material or quality of the regenerator constituent members. When carrying out operation causing a sudden change in the temperature profile in the heating chamber, or operation frequently repeating temperature increase/decrease, the regenerator constituent member tends to be easily granulated due to a thermal shock thereof. When the member has insufficient heat resistance, environmental resistance or resistance against reaction, or the atmosphere in the heating chamber is severer than expected, granulation tends to occur easily. The thus produced powder adheres, precipitates or deposits onto the pore surface of the regenerator, solidifies through reaction, for example, with components of the regenerator constituent member or an environmental gas repeatedly, thus causing choking. The powder tends to remain at places having a decreased flow velocity when passing through the pores of the regenerator. Comparison of a honey-comb type regenerator and a ball type regenerator popularly used at present in heat treatment facilities reveals that Sq(O) is usually larger than Sc(O). However, in the ball type regenerator having false pores not straight, there are many points where the flow velocity decreases in contact areas of the constituent members and in the proximity thereof. Choking phenomenon caused by granulation cannot therefore be disregarded even in the ball type regenerator.

Floating phenomenon of the regenerator constituent member is a phenomenon in which, upon progress of choking, the regenerator constituent member floats up, becoming impossible to withstand the increase in gas pressure, and the shape of the regenerator as a whole is deformed. It is understood that scale choking tends to easily occur on the entry section side and on the exit section side, and does not occur easily within the heating chamber. Granulation phenomenon of the regenerator constituent member takes place in areas of higher temperatures in the heating chamber. Floating phenomenon of the regenerator constituent member occurs in areas with a higher degree of progress of choking.

When assuming a critical choking rate of 50%, the critical service life or the timing of replacement of the regenerator can be defined with the stage in which the choking rate is reached at that point. Measurements of the critical service life or the timing of replacement of the regenerator in areas A1 and A2 near the entry section, areas A3 to A10 covering the first preheating zone to the heating zone, areas A11 to A13 near the flue but closer to the latter half stage of the heating zone, areas A14 to A18 in the soaking zone, and area A19 near the exit section (including a part of A18), reveal the result comprising diverse and various values suggests the following facts:

(1) Progress of choking is rapid in the proximities of the entry section and the exit section;
(2) Progress of choking is rapid near the position leading to opening of the flue;
(3) Progress of choking is rapid in areas in the heating chamber having a large temperature gradient; and
(4) Progress of choking is more rapid near the entry section than near the exit section.

A critical choking rate can be set at a desired value taking account of presence or absence of adverse effect on operation of the heat treatment equipment, effect on the equipment maintenance control cost including the cost required for maintenance operation, size and shape of pores of the regenerator, other forms and materials, environment for use of the regenerator, and various other conditions.

Figure 12:
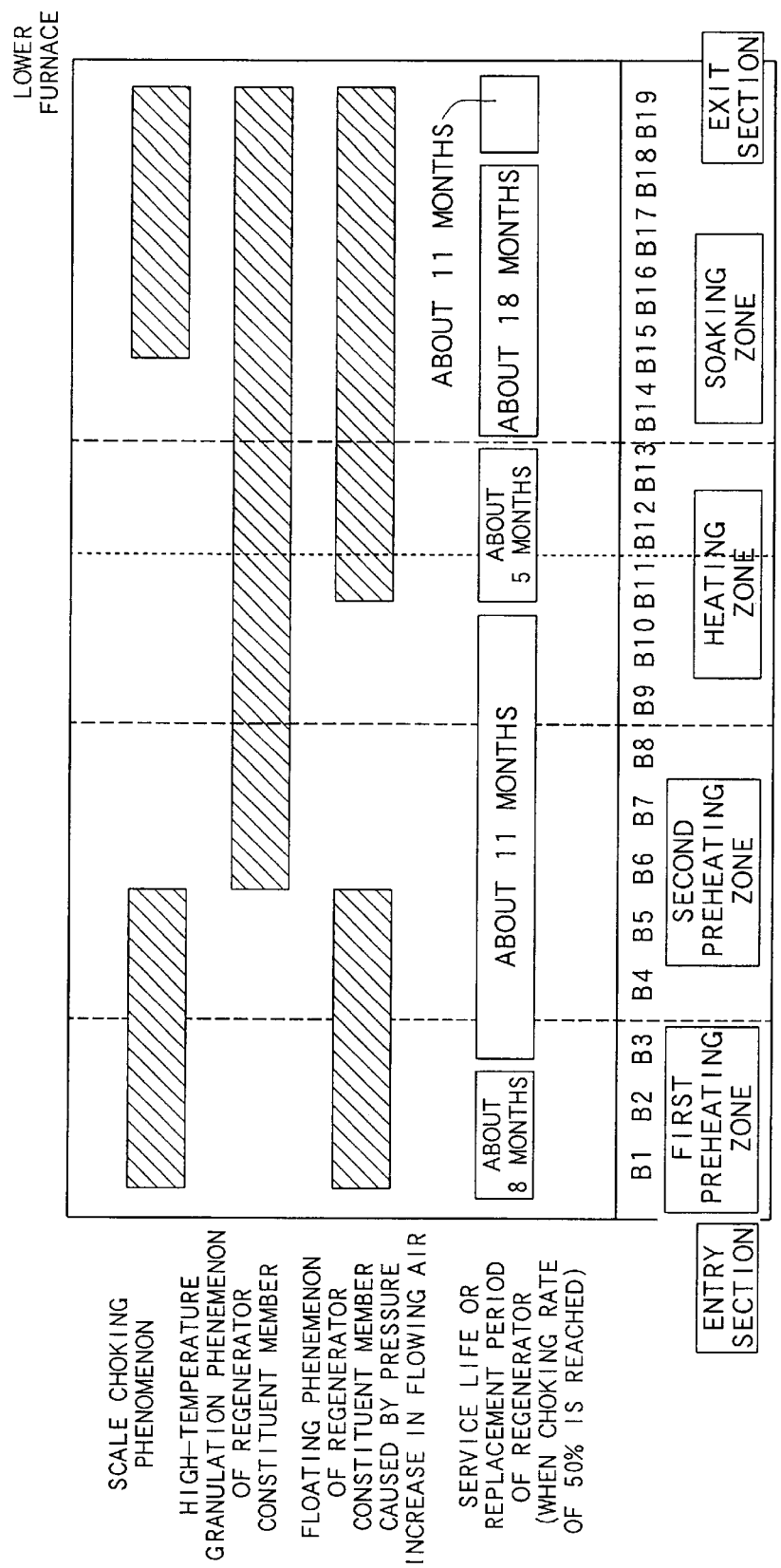
FIG. 12 is a descriptive view of choking phenomenon in the lower furnace.

FIG. 12 illustrates the choking problem of the porous regenerator encountered in the lower furnace as a result of actual operation of the heating furnace. FIGS. 11 and 12 show result of operation simultaneously by operating the same heat treatment equipment under the same conditions. It is known from these drawings that choking occurring in the upper furnace similarly occurs in the lower furnace. The conclusion reached in FIG. 11 about the critical service life of the regenerator applies in the same manner qualitatively also to the lower furnace.

Comparison of FIGS. 11 and 12 suggests that the critical service life is shorter for areas B11 to B13 than for areas A11 to A13, that is, it is understood that in these areas, choking more easily occurs in the lower furnace than in the upper furnace. Floating phenomenon of the regenerative constituent member occurs in wider range in the lower furnace than in the upper furnace, that is, choking phenomenon tends to more easily occur in the lower furnace than in the upper furnace.

Figure 13:
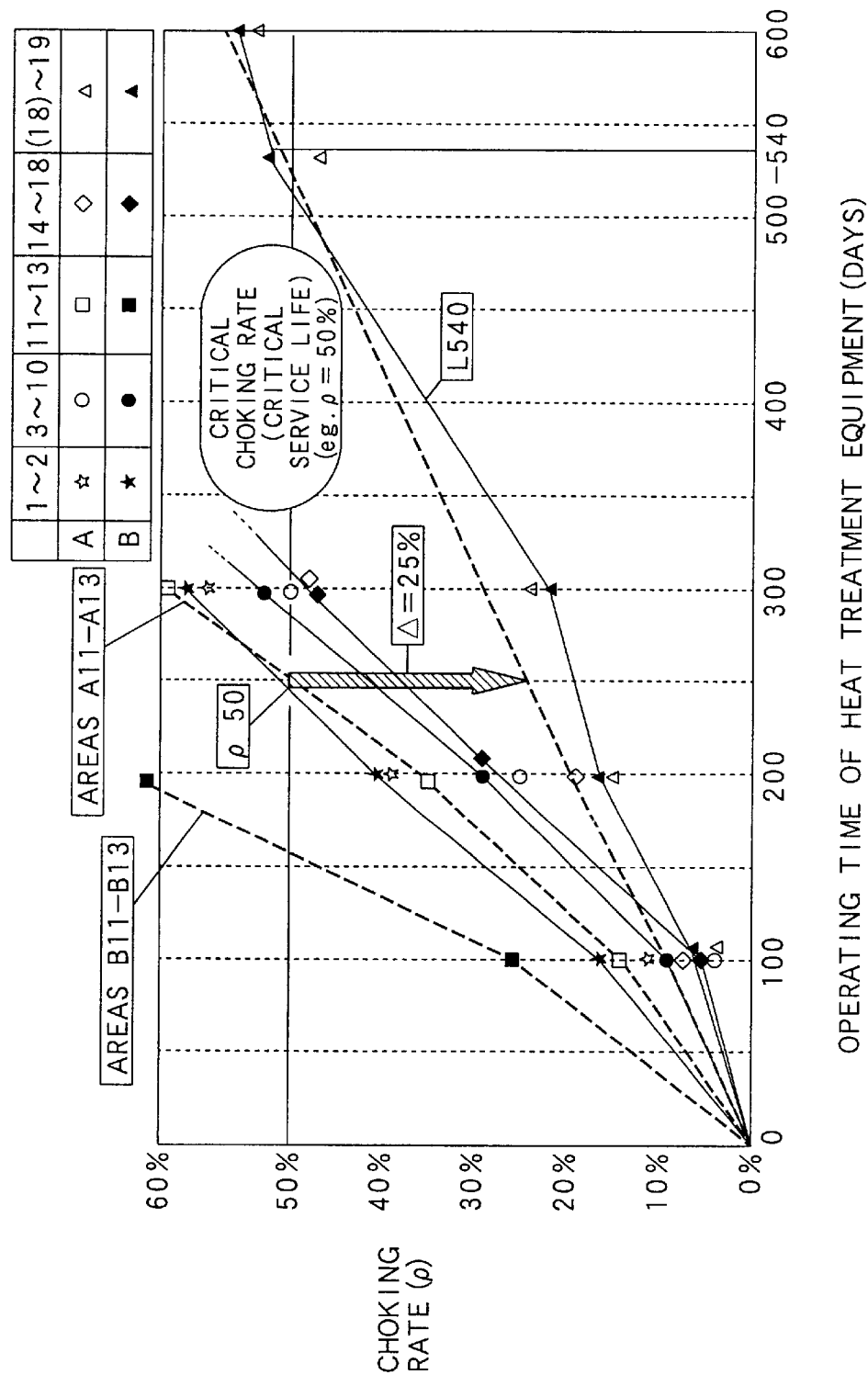
FIG. 13 illustrates the relationship between the choking rate and the operating time for the heating furnace.

FIG. 13 illustrates the result of a more minute analysis of the choking phenomenon of the porous regenerators in the upper furnace and the lower furnace. FIG. 13 also explains the method of setting a substantial average surface pore diameter for preventing or inhibiting choking. It is known from FIG. 13 that the critical service life of the regenerator largely differs between areas B11 to B13 and areas A11 to A13, and for the other areas, there is no marked difference between the upper furnace and the lower furnace, although the critical service life of regenerator is basically shorter for the lower furnace than for the upper furnace. This is attributable to the effect of gravity acting on the off-purpose substances in the heating chamber. The difference between areas B11 to B13 and areas A11 to A13 is markedly larger than in the other areas, perhaps due to opening of the dumper in the flue.

FIG. 13 serves also as a descriptive view of the method of setting a substantial average surface pore diameter for preventing or inhibiting the choking phenomenon.

Consider an example in which design is made so as to achieve a critical service life of about 20 months (about 540 days) for porous regenerators arranged in areas A11 to A13. On the assumption of a critical choking rate of 50%, the relationship between the choking rate and the equipment operating time that gives a critical service life of about 540 days is set by a straight line "L540" in FIG. 13. In the relationship between the choking rate and the equipment operating time for areas A11 to A13, the critical service life corresponding to the critical choking rate is about 250 days. In order to extend the life by about 290 days as remained, therefore, it suffices to reduce the choking rate so as to bring the relationship between the choking rate and the equipment operating time closer to the target value of "L540". This means that it suffices to increase the initial (prior to occurrence of choking) substantial average surface pore diameter for areas A11 to A13 by 25% in advance. By so doing, it is possible to design or select a regenerator having such a substantial average surface pore diameter giving a desired service life of porous regenerators arranged in an area.

When replacing existing porous regenerators in a heat treatment equipment by the porous regenerators designed or selected as described above, all the existing regenerators may be replaced, but only the regenerator constituent members at sites suffering from choking (a range of a certain depth from the surface of the porous regenerators required for defining at least the substantial average surface pore diameter) may be replaced. Such a partial replacement is essentially the same as execution of the aforementioned designing or selecting method.

It is needless to mention that there is imposed a limit on extension of the very short critical service life only through adjustment of the substantial average surface pore diameter. For example, if the substantial average surface pore diameter is excessively extended because of the importance placed on the extension of the critical service life, in spite of a limit value of pore diameter spontaneously determined from the regenerative performance of the direct-fired burner or the regenerative combustor originally demanded in the heat treatment equipment, it is impossible to accomplish necessary heat treatment. Therefore, it is desirable to select porous regenerator exhibiting a behavior close to "L540" as far as possible, and then, adjust the substantial average surface pore diameter.

While "L540" is expressed as a straight line in FIG. 13, the choking phenomenon does not always progress linearly relative to the operating time of the heat treatment equipment. Values of choking rate for the individual areas shown in FIG. 13 present a pattern of snowballing relative to the equipment operating time. Therefore, "L540" is conjectured to take accurately the form of, not a straight line, but a curve. The extent of deviation of "L540" from the straight line is a problem of the degree of modification of the target value, and it suffices to determine the same in accordance with empirical rules, and it suffices to slightly redesign or re-select the substantial average surface pore diameter in response to the deviation from the straight line.

Figure 5:
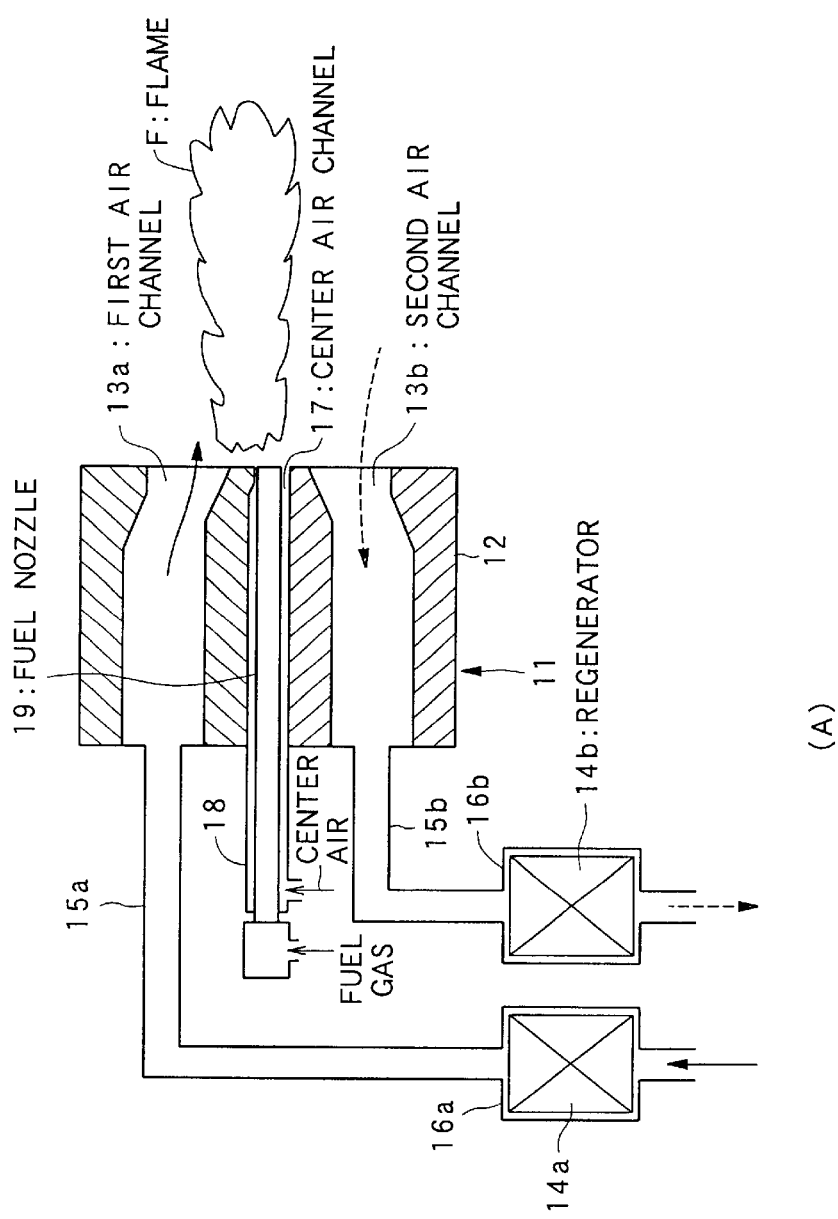
FIG. 5 illustrates a direct-fired burner: (a) is a sectional view and (b) is a side view.
Figure 14:
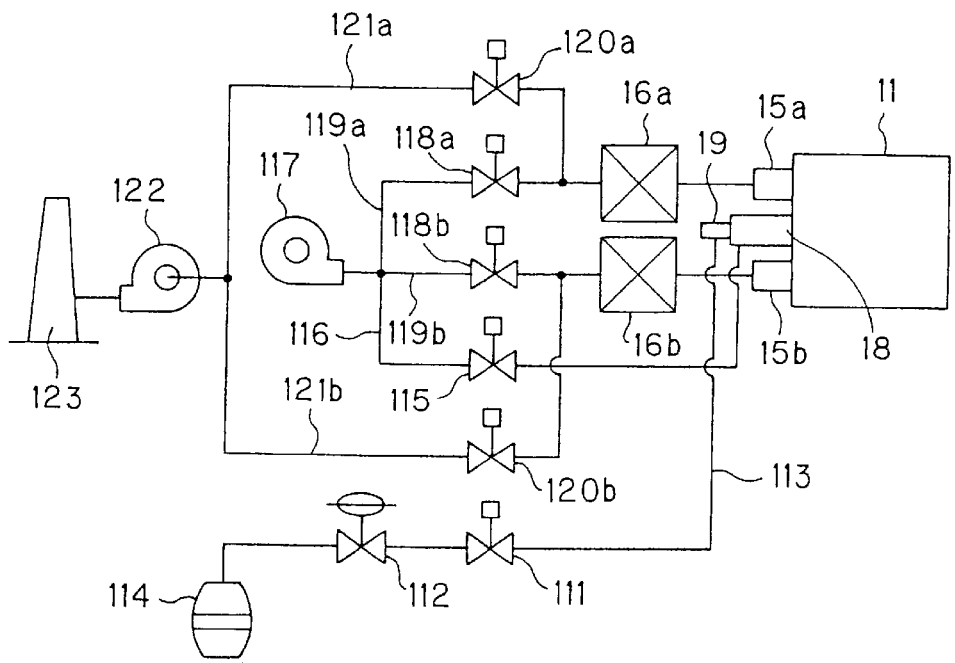
FIG. 14 is a piping diagram of the direct-fired burner shown in FIG. 5.

Other forms of direct-fired burner will now be described. In FIG. 5, 11 represents a burner; 12, the burner main body of the burner 11, comprising a known refractory material; 13*a*, a first air channel; 13*b*, a second air channel; these air channels 13*a* and 13*b* are formed so as to pass through the burner main body 12 in the front/back direction; 14*a* and 14*b*, regenerators comprising honey-comb type promeric members made of a refractory material such as ceramics or container-shaped promeric members containing many ceramic pellets, housed in regenerating boxes 16*a* and 16*b*, respectively, connected to air channels 13*a* and 13*b* via connecting tubes 15*a* and 15*b*. The regenerating boxes 16*a* and 16*b* are separated from each other in FIG. 5, but housing sections of respective regenerators 14*a* and 14*b* may be formed by dividing one regenerating box with a partition. 17 represents a central air channel, formed so as to pass through the burner main body 12 between the air channels 13*a* and 13*b*, having a connecting tube 18 at the rear end thereof; 19, a fuel nozzle passing through the rear end of the connecting tube 18 and inserted into the center air channel 17; and 110, a flame monitoring window, provided on a side of the central air channel 17. The burner 11 having such a configuration is attached to the furnace wall toward the interior of the heating chamber or the furnace with both the air channels 13*a* and 13*b* to which pipes are connected as shown in FIG. 14. More specifically, a fuel nozzle 19 is connected to a gas source 114 via a gas feed line 113 having a cut-off valve 111 and a regulating valve 112. The connecting tube 18 of the central air channel 17 is connected to an air feeder 117 via an air feed line 116 having a cut-off valve 115. The connecting tube 15*a* of the first air channel 13*a* is connected to the air feeder 117 via an air feed line 119*a* having a change-over valve 118*a*, and connected to an induction fan 122 via a waste gas line 121*a* having a change-over valve 120*a*. Similarly, the connecting tube 15*b* of the second air channel 13*b* is connected to the air feeder 117 via the air feed line 119*b* having a change-over valve 118*b*, and connected to the induction fan 122 via the waste gas line 121*b* having a change-over valve 120*b*.

The burner 11 connected as described above is operated in any of two operating modes corresponding to opening/closing of the four change-over valves 118*a*, 118*b*, 120*a* and 120*b* alternatively and repeatedly every prescribed period of time on the basis of an external control signal. In the first operating mode, the change-over valves 118*a* and 120*b* are opened and the change-over valves 118*b* and 120*a* are closed. The second operating mode corresponds to just a reversed case.

Upon combustion of the burner, a fuel gas is fed from the gas source 14 to the combustion nozzle 19 via the gas feed line 113, and a part of combustion air is fed from the air feeder 117 to the central air channel 17 via the air feed line 116. The fuel jet ejected from the combustion nozzle 19, mixed with air ejected from the central air channel 17, comes into contact with high-temperature preheating air ejected from the air channels 13*a* and 13*b*, whereby a flame F is stably supplied. In the first operating mode, combustion air is supplied from the air feeder 117 to the first air channel 13*a* via the air feed line 119*a*, and thus supplied combustion air is mixed with the aforementioned fuel gas and burned to flame F. Waste gas in the heating chamber or the furnace is sucked from the second air channel 13*b* into the waste gas line 121*b*, driven by the induction fan 122, and discharged into the open air from the chimney 123. Further, it is heated through contact with high-temperature waste gas passing through the regenerator 14*b* of the connecting tube 16*b*. When the operation is switched over to the second operating mode, combustion air is supplied from the air feeder 117 to the second air channel 13*b* through the air feed line 119*b*, and this combustion air is mixed with the above-mentioned fuel gas and burned to form the flame F. Waste gas in the heating chamber or the furnace is sucked from the second air channel 13*a* into the waste gas line 121*a*, driven by the induction fan 122, and discharged into the open air from the chimney 123. It is furthermore heated through contact with high-temperature waste gas passing through the regenerator 14*a* of the connecting tube 16*a*. The regenerator 14*b* is thus heated in the first operating mode, and combustion air during the second operating mode is preheated by heat accumulated in this regenerator 14*b*. In contrast, the regenerator 14*a* is heated during the second operating mode, and the combustion air of the first operating mode is preheated by heat accumulated in this regenerator 14*a*. Subsequently, this cycle is repeated.

The direct-fired burner shown in FIG. 5 is different from the operation manner of the direct-fired burners in the regenerative combustor composed of a pair of direct-fired burners shown in FIG. 1 in that the fuel gas is continuously fed without interruption to form the flame F. However, the direct-fired burner shown in FIG. 5 is similar to the direct-fired burner in that operating modes of recovery of latent heat from the combustion gas in regenerator and preheating of combustion air are alternately repeated. Therefore, even when composing a regenerative combustor with a pair of direct-fired burners shown in FIG. 5, and installing the same in the heating furnace shown in FIGS. 2 to 4, in place of the regenerative combustor shown in FIG. 1, there is still encountered the problem of choking in porous regenerator. This is also the case with the regenerative combustor composed of a pair of direct-fired burners shown in FIG. 5, in which the pair of direct-fired burners are alternately burned on the basis of an external control signal. The same problem is encountered even by composing a single regenerative combustor by combining a plurality of direct-fired burners shown in FIG. 5, and operating the plurality of direct-fired burners in various modes. Therefore, irrespective of whether the direct-fired burner shown in FIG. 1 or the direct-fired burner shown in FIG. 5 is used, the present invention is valid when using a plurality of direct-fired burners or a plurality of regenerative heat exchangers.

Figure 15:
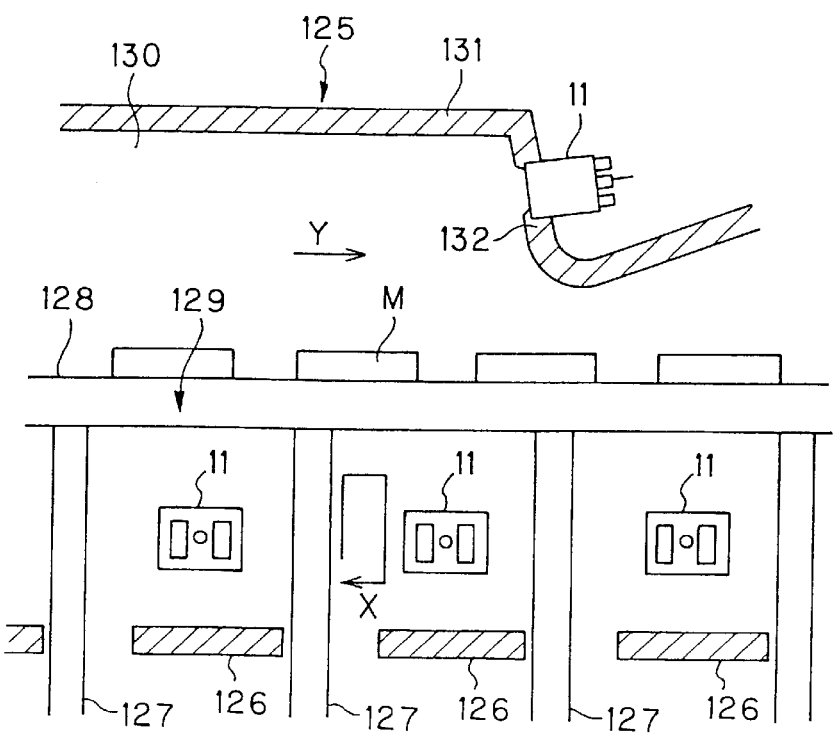
FIG. 15 is a partial sectional view of a walking beam type heating furnace.

An example of application of the direct-fired burner shown in FIG. 5 to a walking-beam type heating furnace is illustrated in FIG. 15. In the walking-beam type heating furnace 125 shown in this figure, a walking beam 129 is composed of a plurality of movable posts 127 passing through a hearth wall 126, and a skid pipe 128 connecting these movable posts 127. An object of treatment M is carried in the Y direction by rectangular movement shown by an arrow X of the movable post 127. In the walking-beam type heating furnace 125, burners 11 are installed on a furnace side wall 130 and on a vertical wall 132 substantially perpendicular to a material conveying direction formed by folding downward a part of the ceiling wall 131. In the walking-beam type heating furnace 125, therefore, the flame formed in the furnace is fed back, after heat diffusion, to an exhausting air channel of the burner 11. As a result, as compared with the conventional walking-beam type heating furnace in which combustion waste gas uniformly flows toward the furnace exit, it is not necessary to specifically provide a hot blast duct or a waste gas duct, thus permitting achievement of a higher space efficiency and cost reduction. A similar advantage is available also when attaching burners onto the side wall at a lower zone of the heating furnace 125.

In the walking-beam type heating furnace 125, the substantial average surface pore diameter of the porous regenerator of the direct-fired burner installed in the upstream in the moving direction of the object M or in the upstream in the arrow Y direction corresponding to the gas flow in the furnace is larger than that of the direct-fired burner installed in the downstream. Particularly, the porous regenerator of the direct-fired burner installed near the entry section of the walking-beam type heating furnace should have a larger substantial average surface pore diameter. When a burner is attached also to the side wall of the lower zone, the substantial average surface pore diameter of the porous regenerator of the lower zone should be set larger than that of the upper zone burner. This permits prevention or inhibition of progress of choking phenomenon of the porous regenerators. The porous regenerator of the burner 11 attached to the vertical wall 132 should have a larger substantial average surface pore diameter than the other burners. Since the walking-beam type heating furnace 125 has a configuration in which the flame formed in the furnace is thermally diffused, and then brought back to the exhausting air channel of the burner 11, many off-purpose substances move toward the porous regenerators of the burner 11, thus causing choking more apparently. In a heating furnace shown in FIG. 15 in which the gas flow in the furnace concentrically passes through the porous regenerators of a particular burner or heat exchanger, it is possible to prevent choking or inhibit progress thereof particularly effectively.

Figure 16:
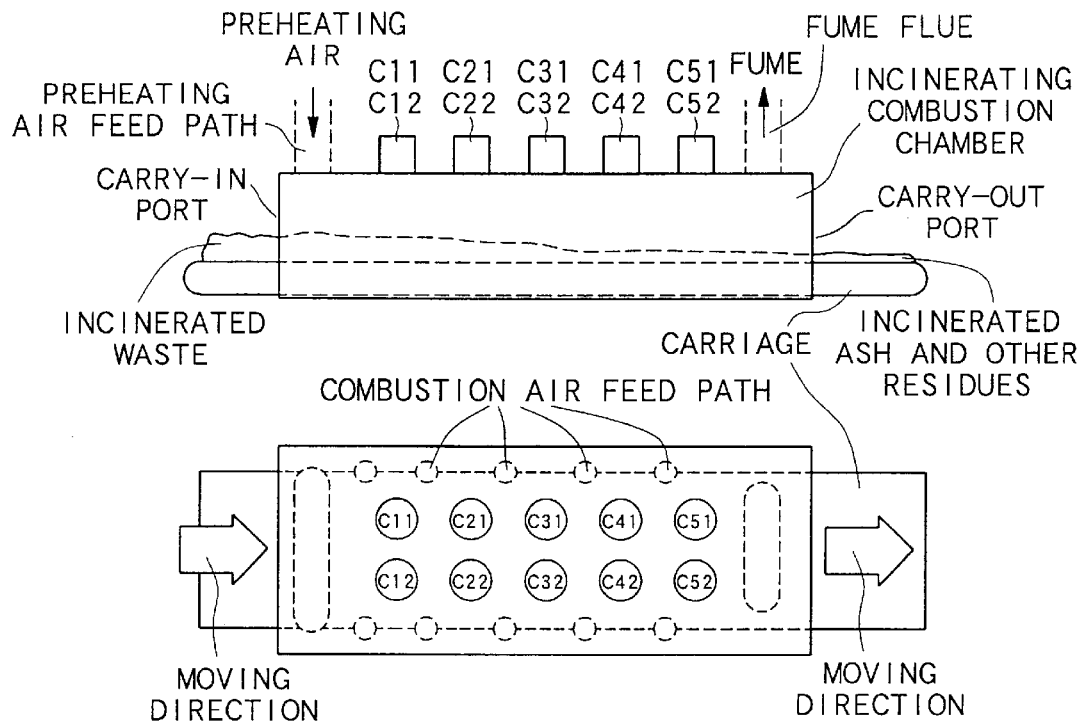
FIG. 16 is a descriptive view of an incinerating equipment: (a) is a side view, and (b) is a plan view.
Figure 17:
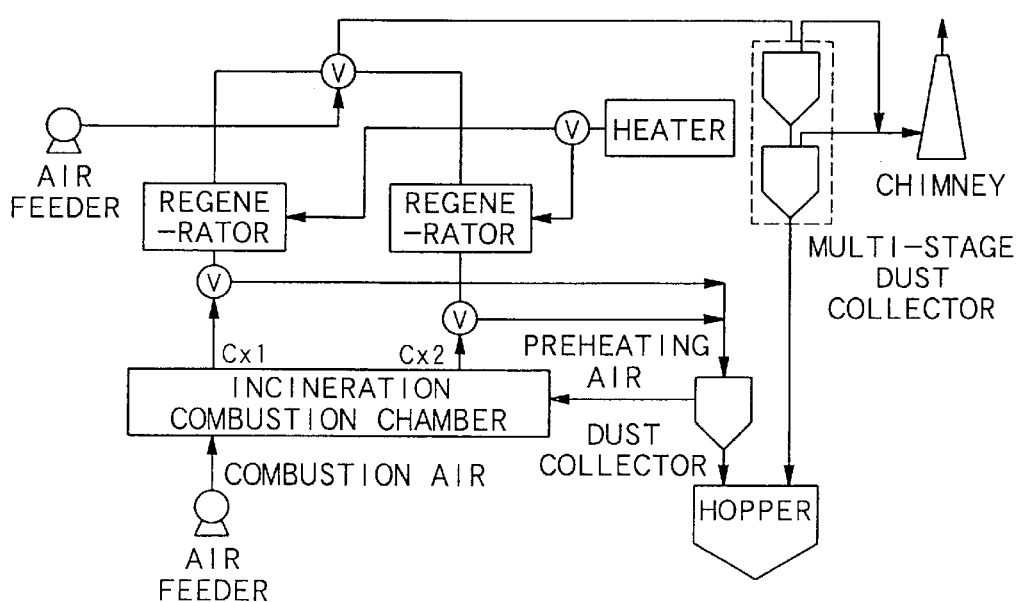
FIG. 17 is a descriptive view illustrating another incinerating equipment.

FIG. 16 illustrates a part of the incinerating equipment for applying a heat treatment during the process of moving an object for combustion. In FIG. 16, (a) is a side view of the main part of the incinerating equipment; and (b) is a plan view thereof. FIG. 17 is a block diagram illustrating the whole incinerating equipment. An incinerating combustion chamber of this incinerating equipment has a combustion equipment (for example, Japanese Unexamined Patent Application Publication No. 5-185057 covering a heating equipment of incinerator ash as an object) using a surface combustion burner which heats a fiber mat and causes combustion of an object to be incinerated through release of radiation heat therefrom (for example, see Japanese Patent No. 2550419). This is not shown in any of the drawings for facilitating understanding of the invention.

As shown in FIG. 16, ten connecting sections Cx1 and Cx2 (x=1 to 5) in total are provided in the incinerating combustion chamber for removing the combustion waste gas in the chamber to outside. There are also provided a preheating air channel for supplying air for preheating the object of incineration, a discharge flue for removing the combustion waste gas, and a combustion air feed path for feeding auxiliary combustion air to promote efficient combustion of the object of incineration. A carrier for moving the incinerated object within the incinerating combustion chamber is also installed. The carrier may automatically convey the incinerated object in some cases, or simply serves as a base for mounting the incinerated object, in some others. Movement of the actual incinerated object in these cases is accomplished by a mechanical mechanism (incinerated object pusher) provided outside the incinerating combustion chamber, or simply by means of gravity. At all events, the gas in the incinerating combustion chamber flows in the same direction as the moving direction of the incinerated object.

In this incinerating equipment, as shown in FIG. 17, the combustion waste gas in the incinerating combustion chamber is removed outside alternately from the connecting sections Cx1 and Cx2 under control of a plurality of valves shown by V. When the combustion waste gas is sent to a multi-stage dust collector through one of the regenerators, the combustion air introduced from the air feeder through the other regenerator is fed to the incinerating combustion chamber. At this point, the other regenerating unit is heated by the heater, thus making it possible to achieve auxiliary preheating of the combustion air. Then, the operating mode is switched over by controlling the valve V. When combustion waste gas is sent to the multi-stage dust collector through the other regenerating unit, the combustion air introduced from the air feeder through the first regenerating unit is fed to the incinerating combustion chamber. Because the first regenerating unit has recovered latent heat of the combustion waste gas during the preceding operating mode, it is possible to perform preheating of the combustion air. It is also possible to conduct auxiliary preheating by heat fed from the heater. When discharging the combustion waste gas toward the multi-stage duct collector, the regenerating unit is kept at a high temperature to some extent. It is therefore possible to simultaneously dry dust contained in the combustion waste gas passing therethrough. The gas after dust collection by the multi-stage dust collector is subjected to a post-treatment not shown, and then discharged through the chimney to outside the system. The porous regenerator used in the regenerating unit is a honey-comb type regenerator, of which the shape, such as ball shape or nugget shape, can be disregarded.

The combustion waste gas removed from the connecting sections Cx1 and Cx2 is sent to the dust collector under control of the valve V without passing through the regenerating unit, and upon completion of dust collection, serves to preheat the incinerated object conveyed into the incinerating combustion chamber. Dust collected by the dust collector is finally sent to the hopper. Any of the known types of dust collector including the cyclone type and the bag filter type may arbitrarily be adopted by considering the operating environment and operating conditions. Fume taken out through the discharge flue shown in FIG. 16 is sent to the multi-stage dust collector, although not shown in FIG. 17, and finally released to outside the system through the chimney.

In this equipment, the regenerating units are installed for the purpose of heat exchange of preheating the combustion air by means of latent heat recovered from the combustion waste gas. As shown in FIG. 17, a pair of regenerating units are installed for each pair of the connecting sections Cx1 and Cx2 (five pairs in total). There are therefore a plurality of pairs of regenerating units in this incinerating equipment.

In the incinerating equipment shown in FIG. 16, therefore, the substantial average surface pore diameter for the porous regenerators of the direct-fired burner arranged in the upstream in the gas flow direction in the incinerating combustion chamber, particularly in an area near the carry-in port of the object of incineration is set to a relatively large value. The substantial average surface pore diameter for the porous regenerators of the direct-fired burner arranged in an area near the carry-out port through which incineration ash and other residues are carried out from the incinerating combustion chamber is set to a relatively large value. The substantial average surface pore diameter for the porous regenerators of the burner arranged in the area near the carry-in port should be larger than that of the burner arranged in an area near the carry-out port. As a result, it is possible to effectively prevent choking or inhibit progress of choking in the upstream of the gas flow, particularly an area near the carry-in port where choking of porous regenerator tends to occur most easily, and in an area near the carry-out port where choking tends to occur next.

In the incinerating equipment shown in FIGS. 16 and 17, a plurality of dust collectors are installed to remove most of substances causing choking, thus making it possible to remarkably decelerate progress of choking. Even in such an equipment, however, it is difficult to remove even very fine off-purpose substances in terms of cost, and these fine substances form main causes of choking of porous regenerators, particularly a cause of deposition of by products.

Figure 18:
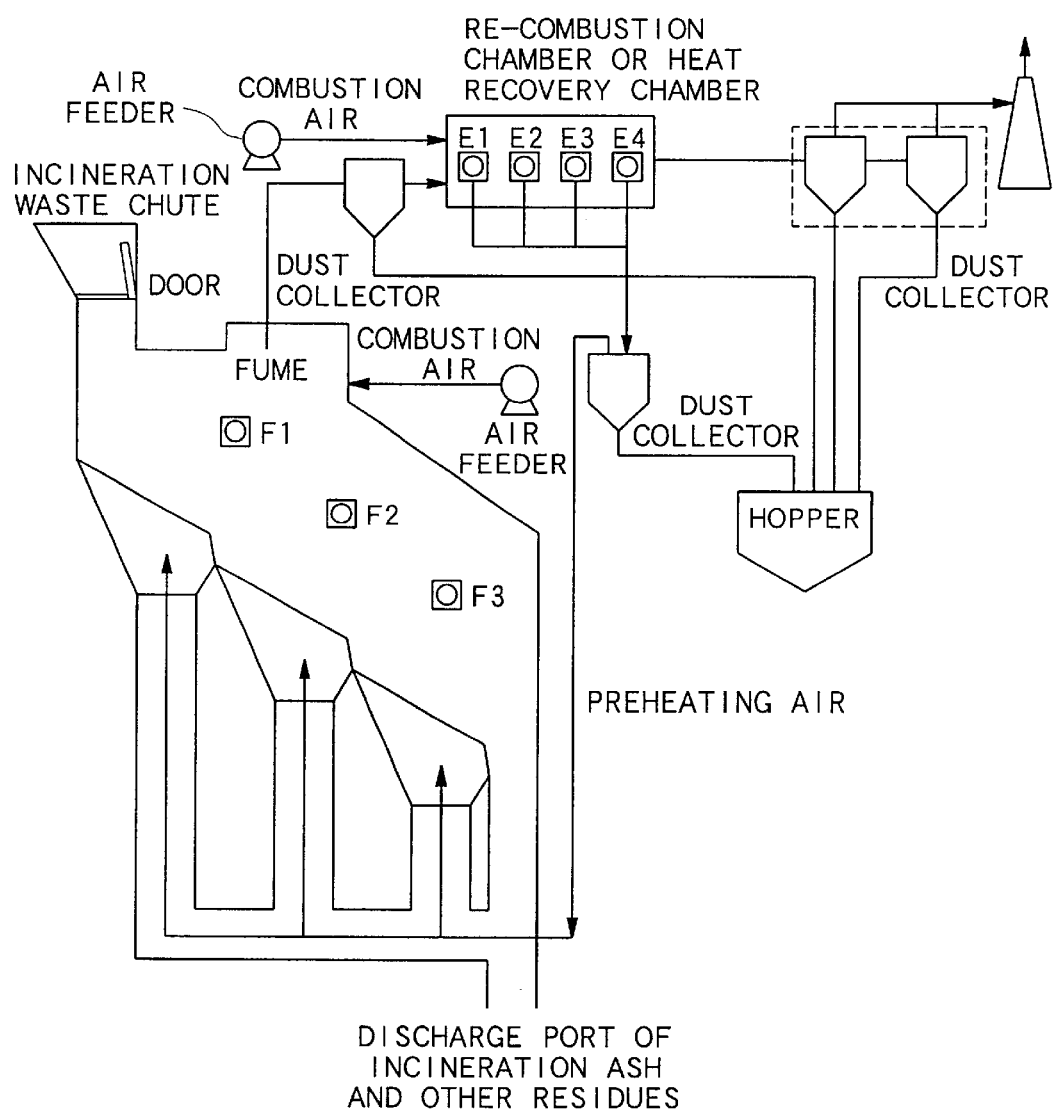
FIG. 18 is a descriptive view illustrating still another incinerating equipment.

FIG. 18 is a block diagram of another incinerating equipment. This equipment is characterized in that a re-combustion chamber is provided for the purpose of removing detrimental substances such as NOx and dioxin contained in the waste gas produced from combustion of the object of incineration by combusters F1 to F3 in the incinerating combustion chamber through a post-treatment. A heat recovery chamber for recovering latent heat of the waste gas may of course be provided in place of, or in addition to, the re-combustion chamber. At all events, there should be provided four units of at least any of a direct-fired burner containing porous regenerators, a regenerative combustor and a regenerative heat exchanger in the re-combustion chamber and/or the heat recovery chamber. These units are represented by E1 to E4 in FIG. 18. Porous regenerators of E1 to E4 are ball type regenerators, but may also be in any other form including, for example, honeycomb type regenerators.

In the incinerating equipment shown in FIG. 18, an object of incineration is charged into the incinerating combustion chamber through an object charging port. The charging port is closed in principle in the other cases. A heat treatment is applied to the object while moving from top to bottom, and finally, incineration ash and other residues are removed outside the system through a discharge port. Auxiliary air may be fed from an air feeder into the incinerating combustion chamber to achieve complete combustion and minimize production of detrimental substances. Apart from this, fume is once sent to the dust collector (whether or not passing through a dust collector can be arbitrarily determined), and then sent to the re-combustion chamber or the heat recovery chamber. When fume is sent to the re-combustion chamber, combustion air is fed into the chamber for promoting combustion treatment in the re-combustion chamber. Combustion waste gas having passed through the re-combustion chamber of the heat recovery chamber or newly produced therein passes through the dust collector, and then discharged outside the system through the chimney.

Four units of at least one of direct-fired burner containing porous regenerators, regenerative combustor and regenerative heat exchanger, E1 to E4, are installed along the gas flowing direction. As a result, it is possible to preheat the air by means of the porous regenerators having recovered latent heat of the combustion waste gas. The preheated air passes through the dust collector (arbitrary), and brought back to the incinerating combustion chamber, thus serving as preheating gas for the incinerated object or the like. Dust collected in the dust collector is finally sent to a hopper and then carried out to outside the system.

The re-combustion chamber or the heat recovery chamber provided separately from the incinerating combustion chamber can be considered as a space provided separately from the incinerating combustion chamber, and E1 to E4 are arranged from upstream to downstream in the gas flow direction of fume (waste gas) removed from the incinerating combustion chamber. The waste gas sent from the incinerating combustion chamber to the re-combustion chamber or the heat recovery chamber has been subjected to a dust collecting treatment. The density of substances causing choking is usually higher on the upstream side than on the downstream side of the gas flow. The substantial average surface pore diameter for the porous regenerator of E1 arranged in a area near the entry section of the re-combustion chamber or the heat recovery chamber should be set at a larger value than those arranged in the other areas. As a result, it is possible to prevent choking of the porous regenerators, or decelerate progress thereof.

As described above, the choking phenomenon largely depends upon operating conditions of the heat treatment equipment or the material or quality of the regenerator constituent members. From the reversed point of view, this means that it is possible to inhibit the choking phenomenon to some extent, although there is a limit, if contrivances are made in the operating conditions of the heat treatment equipment or the materials and quality of the regenerator constituent members. The choking phenomenon in a heating furnace set so as to make it difficult for choking to occur than in the cases shown in FIGS. 10 to 13, by such contrivances (particularly, improvement of material for the regenerator constituent members) will now be described in the following paragraphs.

Figure 19:
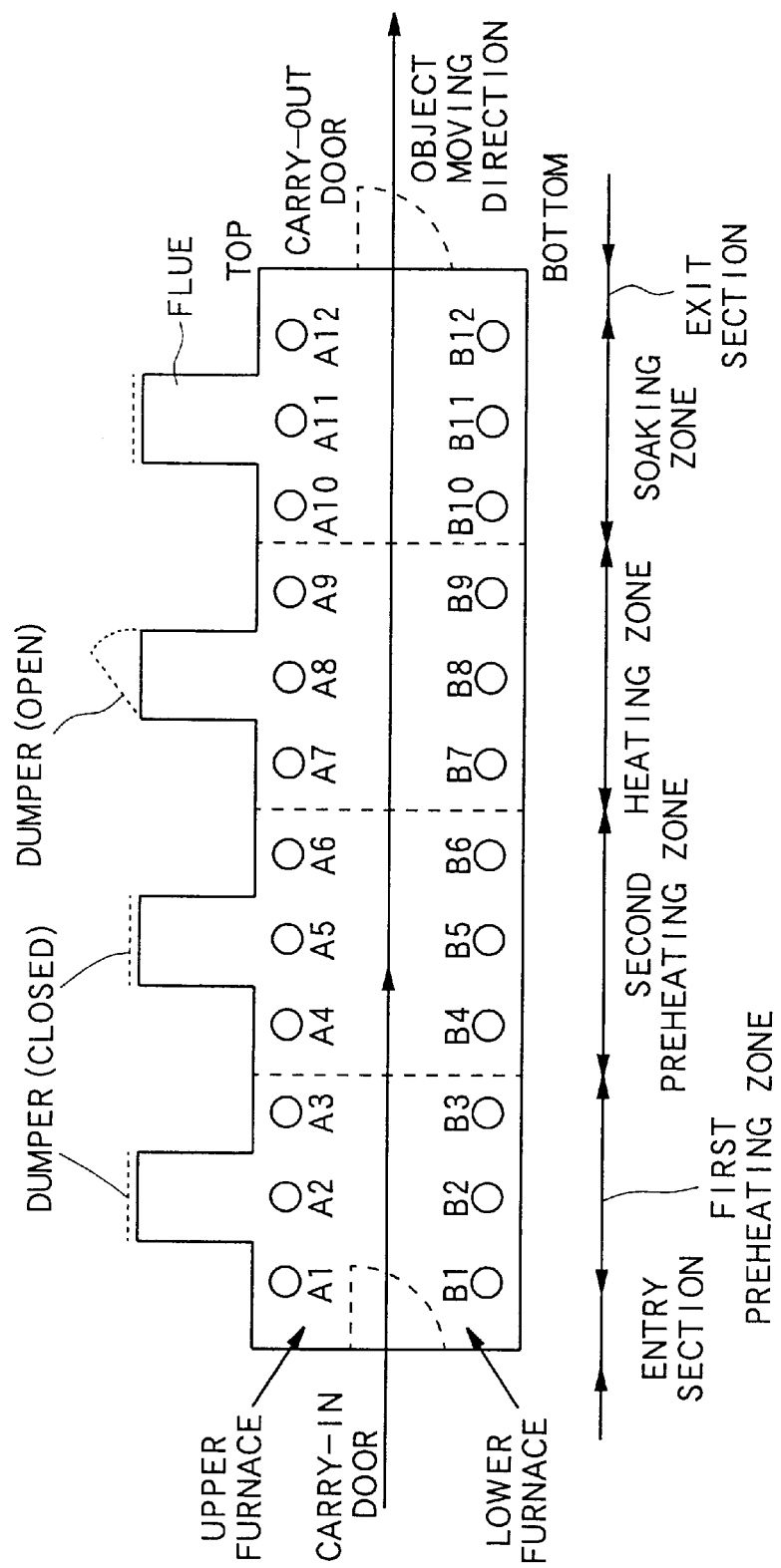
FIG. 19 is a schematic side view illustrating another heating furnace.
Figure 20:
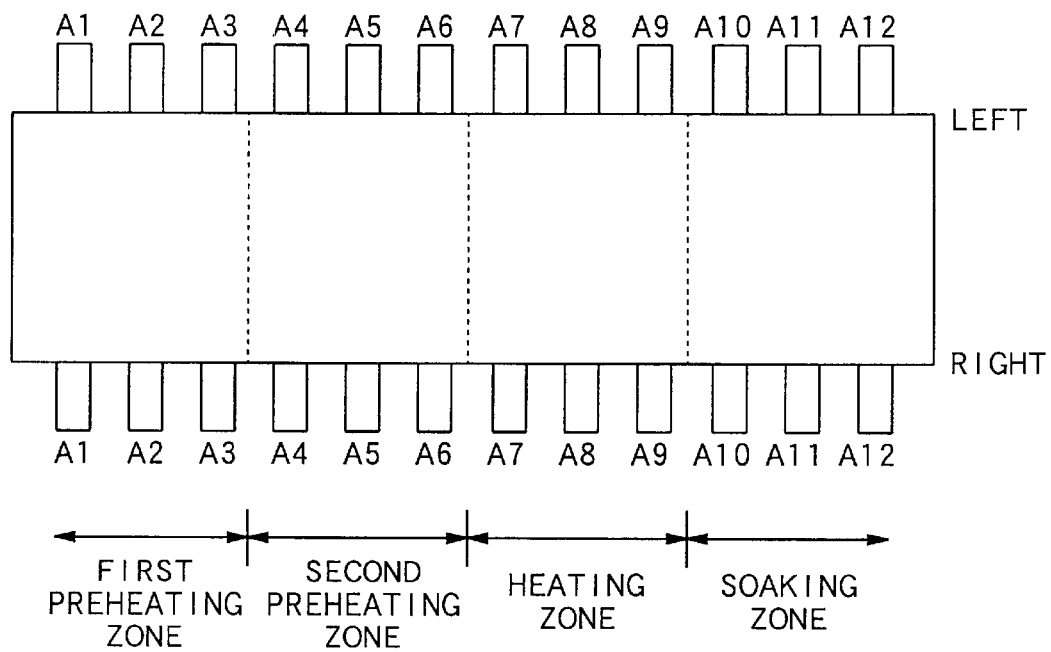
FIG. 20 is a schematic plan view illustrating the arrangement of burners in the upper furnace of another heating furnace.
Figure 21:
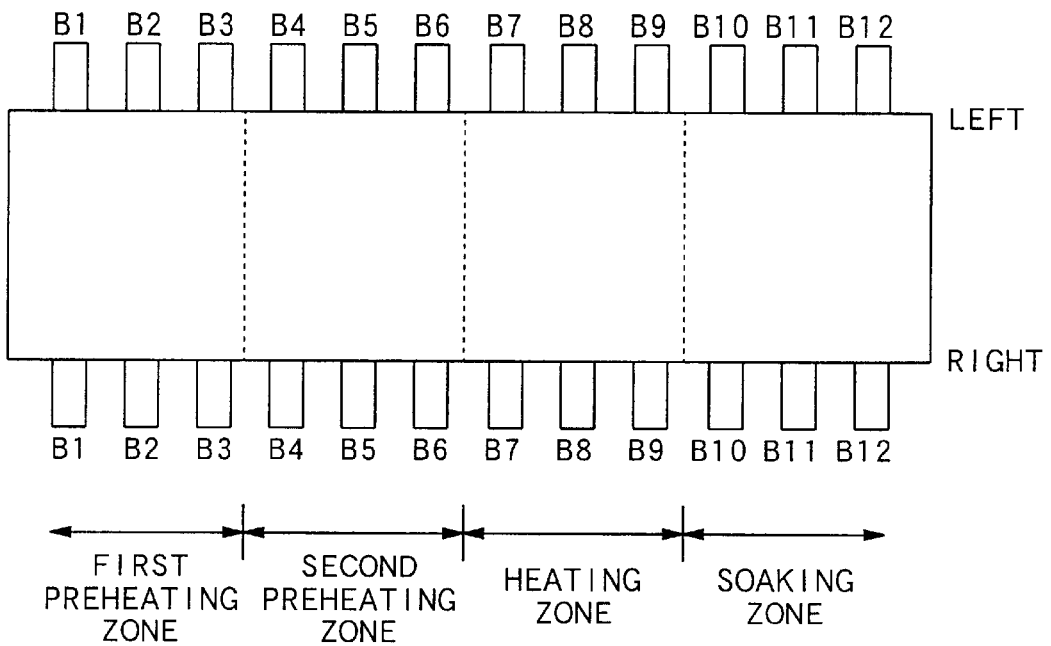
FIG. 21 is a schematic plan view illustrating the arrangement of burners in the lower furnace of another heating furnace.

FIGS. 19 to 21 are a schematic side view and schematic plan views of the upper furnace and the lower furnace in a heating furnace similar to that shown in FIGS. 1 to 5 (hereinafter referred to as the "second heating furnace" for convenience' sake). The heating furnace shown in FIGS. 1 to 5 (hereinafter referred to as the "first heating furnace" for convenience' sake), as is clear from FIGS. 2 to 4, comprises 19 pairs of upper burners and lower burners. The second heating furnace, however, comprises an upper furnace composed of upper burners A1 to A12 and a lower furnace composed of lower burners B1 to B12, i.e., each 12 pairs of upper and lower burners, respectively. These heating furnaces are similar in that there are four zones including a first preheating zone, a second preheating zone, a heating zone and a soaking zone, and a flue and a dumper are installed, but differ in heat input to the regenerative burners.

FIG. 22 illustrates a temperature profile achieved in the heating chamber of the second heating furnace. Because the objects to be heat-treated in the heating chamber are the same material, the second heating furnace and the first heating furnace were operated so as to give approximately the same temperature profile. It is known from FIG. 22 that, although there is a difference in positions corresponding to the burner Nos. shown in horizontal axis, phenomena similar to [A], [B], [C] and [D] shown in FIG. 10 occur also in the heating chamber of the second heating furnace. More specifically, the object moving in the second heating furnace are exposed to rapid heating shown in [B] within the range of from the latter half of the second preheating zone to the heating zone. As a result, choking of the porous regenerators is caused by the endogenous off-purpose substances typically represented by by-products. When opening the carry-in door, temperature of the entry section steeply decreases as shown by [A]. When opening the carry-out door, temperature of the exit section shows a sudden decrease as shown by [D]. In addition, when opening the dumper in the flue present in the heating zone area, there occurs a steep decrease in temperature of the heating zone area as shown by [C]. The extent of temperature drop at [A], [D] and [C] depends upon the opening time of the doors and the dumper, and opening causes ingression of exogenous off-purpose substances into the heating chamber, generation of endogenous off-purpose substances due to temperature drop which in turn causes choking.

FIG. 23 illustrates, in the form of a bar graph, the extent of choking caused in the heating chamber including the first preheating zone, the second preheating zone, the heating zone and the soaking zone in the second heating furnace. While the extent of choking can easily be understood by means of choking rate (ρ) of porous regenerator, the "replacement frequency at regenerator" which is not directly proportional with the choking rate (ρ), but has a positive correlation therewith is set on the ordinate. A honey-comb regenerator is adopted as the porous regenerator. It is known from FIG. 23 that as a result of comparison the degrees of progress of choking in the upper furnace and the lower furnace, the extent of choking is remarkable in areas A1 (B1) to A3 (B3) near the entry section, areas A8 (B8) to A8 (B8) near the flue, and area A12 (B12) near the exit section (the high replacement frequency of regenerators and a short critical service life prior to application of the invention), and that, while the progress of choking is not marked but relatively rather high in areas A6 (B6) to A7 (B7) where the temperature gradient is remarkable. It is also known from FIG. 23 that the lower furnace tends to suffer from choking more easily than the upper furnace.

FIG. 24 illustrates the relationship between the choking rate (ρ) of porous regenerator and the operating time of the heat treatment equipment (i.e., the second heating furnace), and is simultaneously a descriptive view of the setting method of the substantial average surface pore diameter for preventing or inhibiting choking phenomenon. In FIG. 13, the ordinate represents the choking rate (ρ) with a critical choking rate of 50%. In FIG. 24, the specific choking rate (choking rate/critical choking rate) is represented on the ordinate. This will permit more general understanding of the choking phenomenon as compared with the case with simply a choking rate. When setting actually a critical choking rate, it is usual to use a value within a range of from 50 to 60% (depending upon circumstances; about 60% would be the upper limit), and a lower value would lead to an excessively high replacement frequency and not appropriate in cost. Setting the critical choking rate at a higher value results in an excessive pressure of the flowing gas, which tends easily cause floating of the regenerative constituent members, collision and breakage. This leads to an increase in the produced off-purpose substances, and furthermore, may cause troubles such as malfunction, failure, and breakage of the regenerative burner, regenerative combustor, heat exchanger, and hence the heat treatment equipment. This should therefore be avoided from the point of view of safe operation. In FIG. 24, the choking rate is over 1 at a measuring point. Such an operation, though possible, is not basically desirable at all.

In FIG. 24, the relationship between the specific choking rate and the equipment operating time, which gives a critical service life of about 800 days can be set as a straight line "L800" in a manner similar to that of "L540" in FIG. 12 regarding the first heating furnace. Then, the critical service life corresponding to the critical choking rate (i.e., the position giving a specific choking rate of 1) in the relationship between the specific choking rate and the equipment operating time in area A1 is about 410 days. In order to extend the life by the balance of about 390 days, it suffices to decrease the specific choking rate so as to bring the relationship between the specific choking rate and the equipment operating time of area A1 closer to the target value "L800". This means that it suffices to previously increase the initial substantial average surface pore diameter (prior to occurrence of choking) of area A1 by about 50%. Since the critical service life corresponding to the critical choking rate (i.e., position where the specific choking rate becomes 1) in the relationship between the specific choking rate and the equipment operating time of area B1 is about 290 days. In order to extend the life by the balance of about 510 days, it suffices to previously increase the initial substantial average surface pore diameter of area B1 by about 60%, as in the case of area A1. By doing as described above, it is possible to design or select a regenerator having a substantial average surface pore diameter so as to achieve a service life of porous regenerator installed in an area at desired length.

When replacing existing porous regenerators already installed in a heat treatment equipment with the porous regenerators designed or selected as described above, all the existing regenerators may be replaced, but only the regenerator constituent members suffering choking (at least over a range of a certain depth from the surface of porous regenerator required for defining the substantial average surface pore diameter) may be replaced. Such partial replacement is essentially the same as application of the above-mentioned design or selection.

The plurality of direct-fired burners, the plurality of regenerative combustors or the plurality of heat exchangers should be replaced or cleaned (cleaning treatment) upon the lapse of a critical service life even when used so that the substantial average surface pore diameter is not uniform for the porous regenerators contained. Replacement of the constituent members of the porous regenerators means that the constituent members have been used for a sufficiently long period of time, and a high cost curtailing effect (including the reducing effect of equipment management cost relating to maintenance operation of the heat treatment equipment) so far unavailable hereinbefore.

In the embodiment of the present invention described above, description centered around the case where the fuel substance is a gas. So far as choking of porous regenerator may occur, the fuel substance in any of the embodiments of the invention is not limited to a gas but may be a liquid. Even in a case where a substance for achieving a particular object such as desulfurization, denitrification, dioxin removal or the like, it is not excluded from the embodiments of the invention.

According to the present invention, as described above, it is possible, by making contrivances in the form of porous regenerator built in direct-fired burners, regenerative combustors or regenerative heat exchangers arranged in an area where substances causing choking tend of adhere, to make it difficult for these substances to adhere, or even when adhering, prevent it from becoming apparent. There are therefore available such advantages, through extension of the service life or replacement period of porous regenerators, as keeping a high combustion efficiency of regenerative burners or regenerative combustors or high heat exchange efficiency of regenerative heat exchangers, and hence a high operating efficiency of the heat treatment equipment, and permitting cost reduction of the equipment management cost relating to maintenance operation of the heat treatment equipment, thus providing industrially useful effects.

What is claimed is:

1. A heat treatment equipment comprising a heating chamber having a plurality of regenerative combustors having direct-fired burners each having a porous regenerator for applying a heat treatment to an object in the heating chamber; wherein:
   each of said porous regenerators in the plurality of direct-fired burners or the plurality of regenerative combustors have a different substantial average surface pore diameter as compared to other of said porous regenerators.

2. A heat treatment equipment according to claim 1, wherein a temperature gradient is applied to an object in the heating chamber.

3. A heat treatment equipment according to any one of claim 1, wherein said object is carried in the heating chamber, and/or carried out from the heating chamber.

4. A heat treatment equipment according to claim 1, wherein:
said heating chamber has a path entry accessible to outside, and the substantial average surface pore diameter of the porous regenerator of a first and a second direct-fired burners or regenerative combustors arranged in a first area in the proximity of said path entry and a second area not in the proximity thereof is:
not uniform; or:
is larger for the first direct-fired burner than for the second direct-fired burner; or
is larger for the first regenerative combustor than for the second regenerative combustor.

5. A heat treatment equipment according to claim 1, wherein:
said heating chamber has an entry through which an object is carried therein from outside and an exit through which the object is carried thereout, and from among first, second and third direct-fired burners or regenerative combustors arranged, respectively, in a first area closer to the entry, a second area closer to the exit, and a third area different from the first and second areas, the first and second, the first and third, or the second and third direct-fired burners or regenerative combustors have porous regenerators having substantial average surface pore diameter which:
is not uniform; or:
is larger for the first direct-fired burner than for the second direct-fired burner; is larger for the first direct-fired burner than for the third direct-fired burner; or is larger for the second direct-fired burner than for the third direct-fired burner; or
is larger for the first regenerative combustor than for the second regenerative combustor; the first regenerative combustor than for the third regenerative combustor; or is larger for the second regenerative combustor than for the third regenerative combustor.

6. An installing method of a porous regenerator built in a direct-fired burner provided in each of a plurality of regenerative combustors attached to a heating chamber in which a heat treatment is applied to an object carried in from outside; wherein:
each of said porous regenerators are installed in the plurality of direct-fired burners or regenerative combustors and a substantial average surface pore diameter of each of said porous regenerators is different from a substantial average surface pore diameter of the other of said porous regenerators.

7. An installing method of a porous regenerator according to claim 6, wherein:
said heating chamber has a path entry accessible to outside, and a porous regenerator is installed so that the substantial average surface pore diameter of the porous regenerators of a first and a second direct-fired burners or regenerative combustors arranged in a first area in the proximity of said path entry and a second area not in the proximity thereof is:
not uniform; or:
is larger for the first direct-fired burner than for the second direct-fired burner; or
is larger for the first regenerative combustor than for the second regenerative combustor.

8. A manufacturing method of an object heat-treated by arranging an object carried in from outside and/or carried out to outside in a heating chamber in a heat treatment equipment having the heating chamber provided with a plurality of regenerative combustors each having a direct-fired burner having a built-in porous regenerator, wherein the substantial average surface pore diameters of each of the porous regenerators in the plurality of direct-fired burners or the plurality of regenerative combustors are set so as not to be uniform, thereby operating the heat treatment equipment.

9. A manufacturing method of a heat-treated object according to claim 8, wherein:
said heating chamber has a path entry accessible to outside, and the substantial average surface pore diameters of the porous regenerator of a first and a second direct-fired burners or regenerative combustors arranged in a first area in the proximity of said path entry and a second area not in the proximity thereof is:
not uniform; or:
is larger for the first direct-fired burner than for the second direct-fired burner; or
is larger for the first regenerative combustor than for the second regenerative combustor.

10. A heat treatment equipment having a space provided with a plurality of heat exchangers each having a built-in porous regenerator arranged along a flow direction of gas, wherein the substantial average surface pore diameter of each of the porous regenerators in said plurality of heat exchangers are not uniform.

11. A heat treatment equipment according to claim 10, wherein:
the substantial average surface pore diameter is larger for the porous regenerator arranged in the upstream in the flow direction of gas than for the porous regenerator arranged in the downstream thereof; or, the substantial average surface pore diameter is larger for the porous regenerator arranged on the high-temperature side of the temperature of the flowing gas than for the porous regenerator on the lower-temperature side thereof.

12. An installing method of a porous regenerator in a heat treatment equipment provided with a space having a plurality of heat exchangers attached thereto each having a built-in porous regenerator arranged along the flow direction of gas; wherein:
said porous regenerators are installed so that the substantial average surface pore diameter of each of the porous regenerators in a plurality of heat exchangers are not uniform.

13. A manufacturing method of a heat-treated object by arranging an object carried in from outside and/or carried out to outside in a heating chamber in a heat treatment equipment provided with a space having a plurality of heat exchangers attached thereto each having a porous regenerator, arranged along the flowing direction of gas, in a heating chamber; wherein:
the substantial average surface pore diameter of each of the porous regenerators is set so as not to be uniform as compared to other of the porous regenerators in said plurality of heat exchangers, thereby operating the heat treatment equipment.

14. A heat treatment equipment provided with a heating chamber having a plurality of regenerative combustor each having a direct-fired burner having a built-in porous regenerator for applying a heat treatment to an object in the heating chamber, wherein the substantial average surface pore diameter for a porous regenerator arranged at a lower position in the heating chamber as compared to each of the other porous regenerators is larger than the substantial average surface pore diameter of each or the other porous regenerators in the plurality of direct-fired burners or the plurality of regenerative combustors.

15. A heat treatment equipment, wherein a plurality of heat exchangers each having a built-in porous regenerator through which a gas flows; and the substantial average surface pore diameter of each of the porous regenerators in said plurality of heat exchangers is larger for a porous regenerator which is arranged at a vertically lower position as compared to the other porous regenerators.

16. A method of selecting a porous regenerator to be built in a direct-fired burner or a heat exchanger provided in a regenerative combustor, comprising the steps of measuring a decrease in the substantial average surface pore diameter of the porous regenerator occurring along with an increase in the operating period of time of the regenerative combustor or the heat exchanger, and building, in said direct-fired burner or said heat exchanger, a porous regenerator having a substantial average surface pore diameter calculated by previously adding a value corresponding to the difference between the thus measured value and a target value.

17. A component member of a used porous regenerator used by being built in a direct-fired burner provided in each of a plurality of regenerative combustors installed in a heating chamber provided in a heat treatment equipment, and having subsequently become used, wherein the substantial average surface pore diameter is not uniform for each of the porous regenerators prior to starting use thereof.

18. A component member of a used porous regenerator according to claim 17, wherein the choking rate defined as a change rate of the substantial average surface pore diameter of a porous regenerator during operating period of a heat treatment equipment of over 540 days is at least 50%.

19. A component member of a used porous regenerator according to claim 17, wherein the choking rate defined as a change rate of the substantial average surface pore diameter of a porous regenerator during operating period of a heat treatment equipment of over 800 days is at least 60%.

20. A heat treatment equipment according to claim 2, wherein said object is carried in the heating chamber, and/or carried out from the heating chamber.

* * * * *